(12) United States Patent
Jin et al.

(10) Patent No.: US 11,450,899 B2
(45) Date of Patent: Sep. 20, 2022

(54) METHOD FOR DETERMINING BATTERY PACK TEMPERATURE AND STATE OF CHARGE

(71) Applicant: CPS TECHNOLOGY HOLDINGS LLC, New York, NY (US)

(72) Inventors: Zhihong H. Jin, Pewaukee, WI (US); Renate Witt, Milwaukee, WI (US); Steven J. Wood, Shorewood, WI (US); Mark R. Johnson, Milwaukee, WI (US); Michael E. Iverson, Menomonee Falls, WI (US); Matthew Elberson, Menomonee Falls, WI (US)

(73) Assignee: CPS Technology Holdings LLC, New York, NY (US)

( * ) Notice: Subject to any disclaimer, the term of this patent is extended or adjusted under 35 U.S.C. 154(b) by 247 days.

(21) Appl. No.: 16/630,310

(22) PCT Filed: Jul. 12, 2018

(86) PCT No.: PCT/US2018/041882
§ 371 (c)(1),
(2) Date: Jan. 10, 2020

(87) PCT Pub. No.: WO2019/014484
PCT Pub. Date: Jan. 17, 2019

(65) Prior Publication Data
US 2020/0212514 A1 Jul. 2, 2020

Related U.S. Application Data

(60) Provisional application No. 62/531,769, filed on Jul. 12, 2017.

(51) Int. Cl.
*H01M 4/02* (2006.01)
*H01M 10/48* (2006.01)
(Continued)

(52) U.S. Cl.
CPC .......... *H01M 10/482* (2013.01); *B60L 50/66* (2019.02); *B60L 58/12* (2019.02); *H01M 10/425* (2013.01);
(Continued)

(58) Field of Classification Search
CPC ...................................................... H01M 4/02
See application file for complete search history.

(56) References Cited

U.S. PATENT DOCUMENTS

2010/0304193 A1\* 12/2010 Karlsson ............... B60L 3/0046
429/50
2015/0318724 A1 11/2015 Brockman et al.

FOREIGN PATENT DOCUMENTS

CN 104835988 A 8/2015
CN 106471667 A 3/2017

OTHER PUBLICATIONS

International Search Report and Written Opinion of the International Searching Authority dated Dec. 13, 2018 for Int'l. Appln. No. PCT/US2018/041882 filed Jul. 12, 2018, 11 pages.

\* cited by examiner

*Primary Examiner* — Jacob B Marks
(74) *Attorney, Agent, or Firm* — Boardman & Clark LLP

(57) ABSTRACT

Disclosed is a battery system comprising a battery pack having a plurality of cells, each of the plurality of cells each having a cell temperature; a battery management system coupled to the battery pack and designed to obtain temperature plurality of temperatures from the battery pack wherein the battery management system is configured to output a single battery pack temperature value. Further disclosed is a battery system comprising a battery pack having a plurality of cells, each of the plurality of cells each having a cell state of charge; a battery management system coupled to the battery pack and designed to obtain a plurality of state of
(Continued)

charges from the battery pack, wherein the battery management system is configured to output a single battery pack state of charge value.

20 Claims, 16 Drawing Sheets

(51) Int. Cl.
*B60L 50/60* (2019.01)
*B60L 58/12* (2019.01)
*H01M 10/42* (2006.01)

(52) U.S. Cl.
CPC ..... *H01M 10/486* (2013.01); *B60L 2240/545* (2013.01); *H01M 2010/4271* (2013.01); *H01M 2220/20* (2013.01)

METHOD FOR DETERMINING BATTERY PACK TEMPERATURE AND STATE OF CHARGE

CROSS-REFERENCE TO RELATED APPLICATIONS

This application claims priority to U.S. Provisional Patent Application No. 62/531,769 filed Jul. 12, 2017, the entire content of which is hereby incorporated by reference herein in its entirety.

BACKGROUND

Safe battery performance may require battery monitoring. For example, when lithium ion or NiMH batteries are used in a vehicle environment, such batteries may be accompanied by a battery management system (BMS) which may facilitate battery monitoring. Battery monitoring may include measuring battery temperature and state of charge (SOC). Based on these readings, vehicle systems may provide information on battery state.

Because battery systems are typically comprised of a number of battery cells, temperature and state of charge may vary among each cell. Individual cell state of charge and temperature measurements may not reflect the overall state of charge or temperature of the battery pack. Therefore, methods have been developed to determine an overall state of charge of a battery pack. The determined overall state of charge may be understood as a reported state of charge—i.e. what is reported to the vehicle. Similarly, the determined overall temperature may be understood as the reported temperature.

One known method determines the state of charge based on average temperature and cell state of charge. When maximum cell temperature or maximum state of charge is approaching the maximum limits, while the cell average temperature and state of charge is still below the high threshold, the reported battery temperature or state of charge (i.e. determined overall temperature or state of charge) is significantly lower than the maximum cell temperature or state of charge which can mislead or confuse users. The same may also be true for low temperature.

Accordingly, there is a need for a system and method which remedies the above deficiencies by improving accuracy and reports: a single state of charge to a vehicle based on a plurality of state of charge readings, a single temperature to a vehicle based on a plurality of temperature readings.

SUMMARY

Accordingly, the proposed system and method are directed towards remedying such known deficiencies and addressing such needs. Therefore, the proposed system and method obtains a number of cell temperature readings and determines a single battery pack temperature for output. In addition, the proposed system and method obtains a number of individual cell state of charge (SOC) readings, determining and outputting a single battery pack state of charge. The proposed system and method may evaluate a number of factors (including but not limited to maximum cell temperature, minimum cell temperature, and the like) in the individual cell temperature readings as well as vehicle parameters in order to overcome the issues described. In addition, the proposed system and method may evaluate a number of factors in the individual cell SOC readings (including but not limited to maximum cell SOC, minimum cell SOC, and the like) as well as vehicle parameters in order to overcome the issues described.

The proposed method may identify thermal management fault and system imbalance faults by comparing the spread of cell temperature and within the battery pack and ensuring the calculated battery pack temperature (reported temperature) represents the battery pack performance limits at extreme situations, thereby improving the algorithm robustness. Similarly, the proposed method improves algorithm robustness by identifying SOC management fault and system imbalance faults by comparing the spread of cell SOC and within the battery pack and ensuring the calculated battery pack SOC (reported SOC) represents the battery pack performance limits at extreme situations. For example, in the high end of the operating temperature, the battery pack performance is limited by maximum cell temperature. In the low end of the operating temperature region, the battery pack performance is limited by minimum cell temperature. Similarly, in the high end of the operating SOC, the battery pack performance is limited by maximum cell SOC. In the low end of the operating SOC region, the battery pack performance is limited by minimum cell SOC.

Advantageously, the method disclosed herein may provide battery pack users one battery pack temperature for a battery pack (which includes multiple cells, for example but not limited to six cells)) instead of individual temperature readings or min, max, and average temperature as control inputs. Also advantageously, the method disclosed herein may provide battery pack users one battery pack SOC for a battery pack instead of individual SOC readings or min, max, and average S(X as control inputs. Additionally, charge and discharge capabilities may also be provided, as well as the remaining amount of discharge, among other features.

Disclosed is a battery system comprising a battery pack having a plurality of cells, each of the plurality of cells each having a cell temperature; a battery management system coupled to the battery pack and designed to obtain a plurality of temperatures from the battery pack and output a single battery temperature, the battery management system including: a high temperature threshold value; a low temperature threshold value; and a drop value; wherein the battery management system is further configured to: if a first criteria is satisfied, assign a high value to the battery temperature; if the second criteria is satisfied but not the first criteria, assign a mid-high value to the battery temperature; if the third criteria is satisfied but not the first or second criteria, assign an average of the obtained cell temperatures to the battery temperature; if the fourth criteria is satisfied but not the first, second, or third criteria, assign a mid-low value to the battery temperature; if the fifth criteria is satisfied but not the first, second, third, or fourth criteria, assign a low value to the battery temperature; and output a single battery pack temperature value. Further disclosed is a system wherein the battery management system is further configured to use the cell temperature and threshold values to determine if there is a battery fault or error. Further disclosed is a system wherein the battery management system is further configured to assign a minimum value to the battery temperature when none of the criteria are fulfilled. Further disclosed is a system wherein the battery management system is further configured to assign an average value to the battery temperature when none of the criteria are fulfilled. Further disclosed is a system wherein the battery system is configured to obtain a plurality of state of charge values from the plurality of batteries. Further disclosed is a system wherein the battery management system is further configured to evaluate the plurality of state of charge values against certain criteria. Further disclosed is a system wherein the battery management system outputs a single state of charge for the battery. Further disclosed is a method of determining battery pack temperature using the system.

Disclosed herein is a system for determining battery pack state of charge. The system comprises a battery management system coupled to the battery pack and designed to obtain each of the cell state of charge from the plurality of cells, the battery management system including: a high state of charge threshold value; a low state of charge threshold value; a drop value; wherein the battery management system is further configured to: if a first criteria is satisfied, assign a high value to the battery state of charge; if the second criteria is satisfied but not the first criteria, assign a mid-high value to the battery state of charge; if the third criteria is satisfied but not the first or second criteria, assign an average of the obtained cell temperatures to the battery state of charge; if the fourth criteria is satisfied but not the first, second, or third criteria, assign a mid-low value to the battery state of charge; if the fifth criteria is satisfied but not the first, second, third, or fourth criteria, assign a low value to the battery temperature; and output a single battery pack state of charge value. Further disclosed is a system wherein the battery management system is further configured to use the cell state of charge and threshold values to determine if there is a battery fault or error.

Disclosed is a method for determining a battery pack temperature and state of charge. The method comprises: assigning a plurality of temperature threshold variables; obtaining a plurality of temperature readings from each of a plurality of cells; evaluating the plurality of temperature readings against a plurality of criteria, including: determining if a first criteria is satisfied and, if so, assigning a high value to the battery temperature; determining if a second criteria is satisfied but not the first criteria, and if so, assigning a mid-high value to the battery temperature; determining if a third criteria is satisfied but not the first or second criteria, and if so, assigning an average of the obtained cell temperatures to the battery temperature; determining if the fourth criteria is satisfied but not the first, second, or third criteria, and, if so, assigning a mid-low value to the battery temperature; determining if the fifth criteria is satisfied but not the first, second, third, or fourth criteria, and, if so, assigning a low value to the battery temperature; and outputting a single battery pack state of charge value. Further disclosed is a method comprising: assigning a plurality of state of charge threshold variables; obtaining a plurality of state of charge readings from each of a plurality of cells; evaluating the plurality of state of charge readings against a plurality of criteria; and outputting a single battery pack state of charge to a vehicle system. Further disclosed is a method comprising wherein evaluating the plurality of state of charge readings against a plurality of criteria further comprises: determining if a first criteria is satisfied and, if so, assigning a high value to the battery state of charge; determining if a second criteria is satisfied but not the first criteria, and if so, assigning a mid-high value to the battery state of charge; determining if a third criteria is satisfied but not the first or second criteria, and if so, assigning an average of the obtained cell temperatures to the battery state of charge; determining if the fourth criteria is satisfied but not the first, second, or third criteria, and, if so, assigning a mid-low value to the battery state of charge. Further disclosed is a vehicle performing the methods disclosed herein. Further disclosed is a vehicle having the systems described herein.

These and other features and advantages of devices, systems, and methods according to this invention may be described in, or are apparent from, this description and the drawings. Further disclosure and advantages may be apparent from the drawings and descriptions provided herein.

BRIEF DESCRIPTION OF THE DRAWINGS

FIGS. 5B-1, 5B-2, 5B-3 show a number of example graphs using the method for determining battery pack temperature, according to various examples of embodiments.

FIGS. 8B-1 and 8B-2 show a number of example graphs using the method for determining battery pack temperature, according to various examples of embodiments.

FIGS. 9B-1 and 9B-2 show a number of example graphs using the method for determining battery pack temperature, according to various examples of embodiments.

It should be understood that the drawings are not necessarily to scale. In certain instances, details that are not necessary to the understanding to the invention or render other details difficult to perceive may have been omitted. It should be understood, of course, that the invention is not necessarily limited to the particular embodiments illustrated herein.

DETAILED DESCRIPTION

A system and method for determining battery pack temperature and battery pack state of charge according to various embodiments will now be described in detail.

Figure 1:
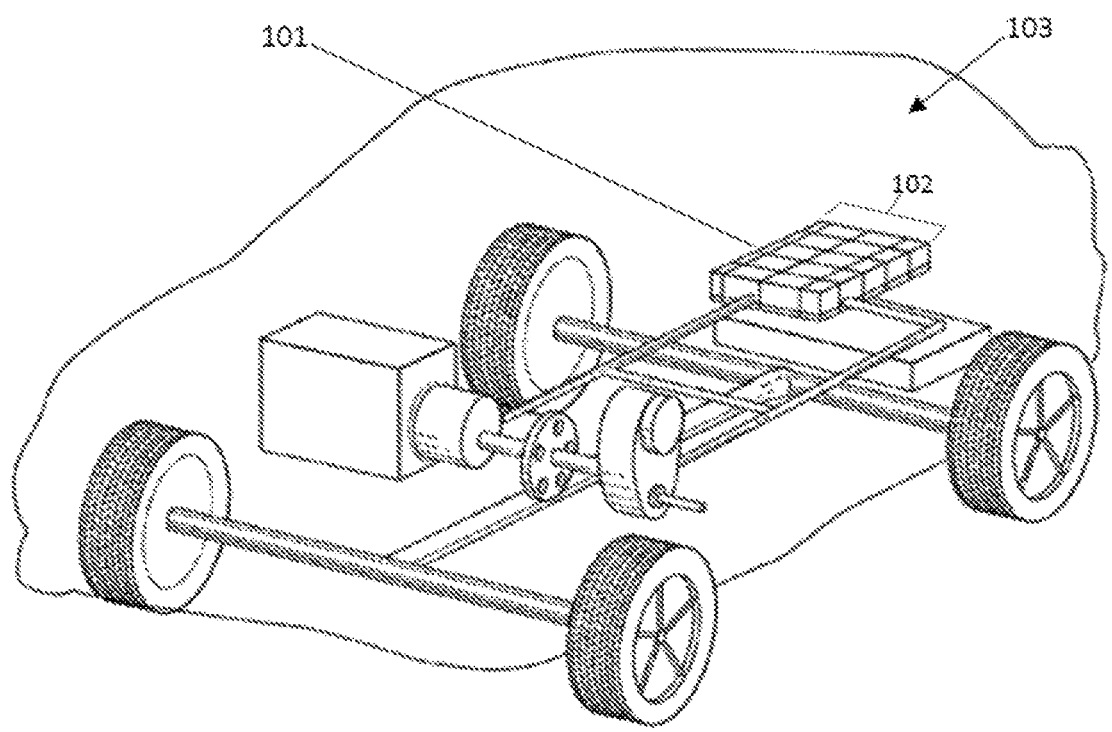
FIG. 1 shows a view of a vehicle having a battery and battery management system, according to various examples of embodiments.

In FIG. 1, a cutaway view of a vehicle 103 is shown. The vehicle 103 is shown having a battery system 101 which is comprised of a plurality of battery cells 102. The battery cells 102 may be understood to comprise a battery pack or system 101 which then provides power to the vehicle 103 to support vehicle functionality.

Figure 2:
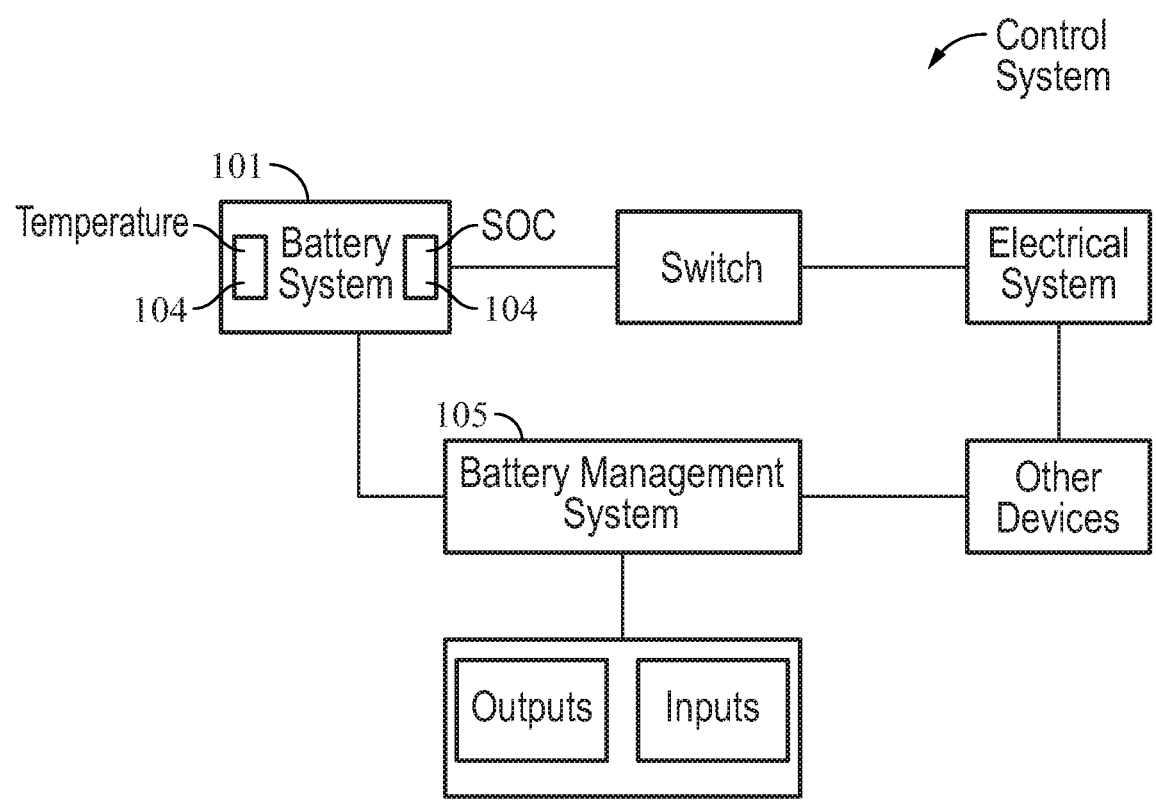
FIG. 2 shows an electrical system having a battery and battery management system, according to various examples of embodiments.

FIG. 2 shows a view of a vehicle control system, which may include again, a battery system 101 but also a battery management system (BMS) 105. As can be seen, the battery management system or BMS 105 is in communication with the battery system 101 and the vehicle 103 and its related electrical systems. This may allow, in various embodiments, for measurement of battery attributes and reporting thereof to the vehicle 103. The battery system 101 may further comprise a plurality of sensors 104 for obtaining temperature and/or state of charge information about the battery. The battery management system 105 may include a processor for analyzing the temperature and/or state of charge information about the battery 101. A temperature sensor and SOC sensor (generally, sensors 104) may be provided for each battery cell 102, in various embodiments. Alternatively, a temperature sensor may be provided, for example, in the battery system 101 for a group of battery cells 102 such that the number of temperature sensors is less than the number of cells. In either case, in various embodiments, a plurality of temperature sensors may be provided in the battery 101 to obtain a plurality of temperature readings. In various embodiments, the temperature readings may be obtained by the sensors essentially simultaneously. Similarly, a plurality of SOC sensors may be provided for more than one battery cell 102 such that the number of SOC sensors is less than the number of cells, in various embodiments. In either case (number of SOC sensors equal to number of cells, number of SOC sensors less than number of cells), in various embodiments, a plurality of SOC sensors may be provided in the battery 101 to obtain a plurality of SOC readings. In various embodiments, the SOC readings may be obtained essentially simultaneously.

When using a battery 101 in a vehicle, for example vehicle 103, certain requirements may be met to ensure safe vehicle operation. These parameters may be established by car manufacturers or other vehicle systems designers to ensure proper power delivery to the vehicle. In various embodiments, these requirements may impact battery management systems features. For example, these requirements may include likely fault conditions and/or operational requirements (e.g. battery temperature may need to change smoothly for interaction with the vehicle).

Figure 3:
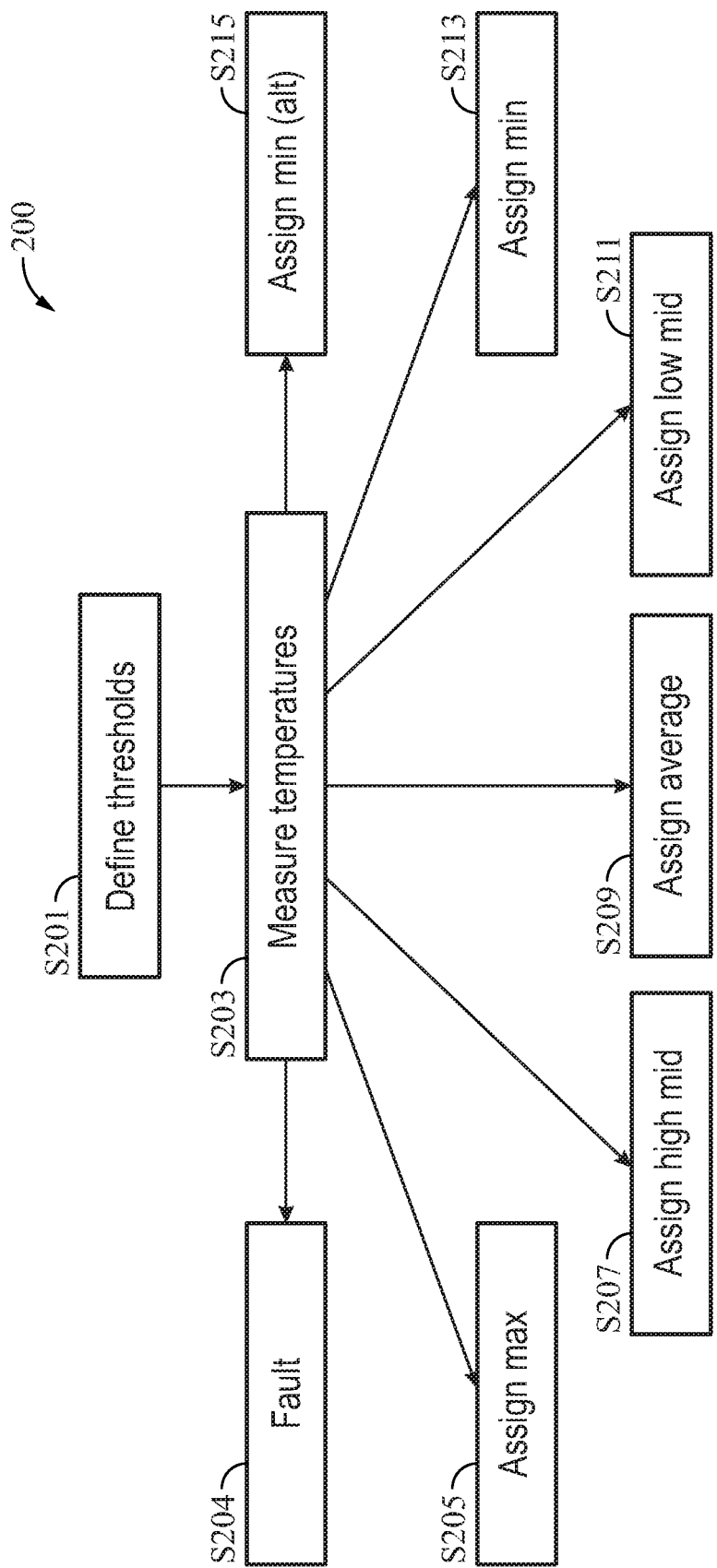
FIG. 3 shows a method for determining battery pack temperature, according to various examples of embodiments.

FIG. 3 shows a first method for measurement of a battery temperature 200, according to various embodiments. The method 200 may take in temperature readings (for example, from a plurality of sensors 104 provided in a battery pack 101) from each cell 102 (for example, each of six cells) or less than each cell 102 and, in various embodiments, output a single temperature value for the battery pack 101.

In S201, threshold values for battery temperature measurements are defined. These values may include a high temperature threshold (in various embodiments noted as Thigh), a low temperature threshold (in various embodiments noted as Tlow), a temperature drop (in various embodiments noted as Tdrop), and a temperature gap (in various embodiments noted as Tgap).

Thigh may be understood as a high temperature threshold. The high temperature threshold may be set to the temperature value above which the system performance (for example, power or current limits) begin to decrease significantly. In various embodiments, the range may be −40 C to 85 C. The low temperature threshold, Tlow, may be understood as the low temperature below which the system performance (e.g. power or current limits) start to decrease significantly. In various embodiments, the range of temperatures for Tlow ranges from −40 C to 85 C.

A spread threshold, Tspread, may also be given. Tspread may be understood as a maximum difference in temperature between the lowest cell temperature and highest cell temperature. If the difference between maximum cell temperature and average cell temperature is higher than this value, a fault may be given or set to indicate a problem with the battery thermal management system (e.g. thermal management fault, for example, based on a cell temperature sensor such as maximum cell temperature sensor). If the difference between minimum cell temperature and average cell temperature is higher than this value, a fault may be set to indicate a problem with the thermal management system based on minimum cell temperature sensor. Tspread may be assigned as the maximum possible delta (difference in) temperature between the cells estimated by system thermal modeling (e.g. for the vehicle) for a poor operating situation. In various embodiments, Tspread has a range of −40 C to 85 C. As a non-limiting example, Tspread may particularly be 10 C.

A temperature drop value. Tdrop, and a temperature gap value, Tdelta (or Tgap) may also be given. Tdrop may be understood as the minimum delta of cell maximum temperature below high temperature threshold, where the blended temperature needs to shift towards the maximum cell temperature value. In various embodiments, Tdelta or Tgap should be greater than or equal to Tdrop. The Tdelta or Tgap value may be used to select the blended temperature calculation algorithm and may have a value in the range of −40 C to 85 C.

A number of other variables may be assigned based on actual measurements obtained regarding each battery cell temperature in step S203 of FIG. 3. In other words, once cell temperature values are obtained, the system may process the values in order to assign certain variable values.

For example, the maximum cell temperature, Tmax, may be determined by the maximum obtained cell temperature of the plurality of cells. The minimum cell temperature, Tmin, may be understood as the minimum obtained cell temperature of the plurality of cells. A mid (middle) value, Tmid, may be determined by an average of Tlow and Thigh. In other words, Tmid=(Tlow+Thigh)/2. An average temperature, Tavg, may be determined by averaging all obtained cell temperature readings. Given these base values, the following values may also be defined or assigned by the system, in various embodiments:

1. A low mid value, Tlowmid, may be determined as follows:
   Tlowmid=Tmid−(Tavg−Tmin)
2. A high mid value, Thighmid, may be determined as follows:
   Thighmid=Tmid+(Tmax−Tavg)
3. A high gap value, Thighgap, may be determined as follows:
   Thighgap=Thigh−Thighmid;
4. A low gap value, Tlowgap, may be determined as follows:
   Tlowgap=Tlowmid−Tlow; and
5. A high drop value, Thighdrop, may be determined as follows:
   Thighdrop=Thigh−Tdrop.

In step S204, the system may check for one or more faults or errors. These may include the checks outlined above (such as the difference between the highest and lowest reading exceeding Tspread), as well as where Tavg−Tmin>Tspread and Tmax−Tavg>Tspread. A fault may allow for indication of a particular or many issues with the system. For example, if maximum cell temperature is higher than average (Tavg) cell temperature for more than a calibratible amount or if minimum cell temperature is lower than average (Tavg) cell temperature for more than a calibratible amount, the likely faults can be: a cell temperature sensor in range fault, the cell temperature sensor loss of contact to cells, and coolant air flow blockage or localized heating.

In step S205, the system may assign a maximum to the battery pack temperature. In other words, the system may determine if cell temperature exceeds a threshold. In that case, if the cell temperature with the highest reading, Tmax, exceeds or equals Thigh, the battery pack temperature, Tbatt, will be assigned the value of Tmax.

In step S207, a mid-high (i.e. middle-high) value may be assigned as the battery pack temperature, for example, if the criteria of step S205 is not fulfilled. In one or more examples of embodiments, the system may look for whether Thighgap exceeds Tgap and Tlowgap exceeds Tgap and if Tmax>=Thighmid and Tmax<Thigh (i.e. if Tmax exceeds or is equal to Thighmid and Tmax is less than Thigh), then the overall battery temperature, Tbatt, is equal to Tavg*(Thigh−Tmax)/(thigh=Thighmid)+Tmax*(Tmax−Thighmid)/Thigh−Thighmid. Alternatively, the system may use the evaluation process outlined in step S207 of FIGS. 4 and 5.

In step S209, in various embodiments, the system may assign the battery a temperature value equal to Tavg. In various embodiments, this evaluation may look at whether Tmin>Tlowmid && Tmax<Thighmid. Alternatively, the system may use the evaluation processes outlined in step S209 of FIGS. 4 and 5.

In step S211, the system checks to assign a mid-low (i.e. middle-low) value. In various embodiments, this evaluation may look if Tmin<=Tlowmid && Tmin>Tlow. If so, the overall temperature of the battery, Tbatt, may be assigned the following value: Tavg*(Tmin−Tlow)/(Tlowmid−Tlow)+Tmin*(Tlowmid−Tmin)/(Tlowmid−Tlow). Alternatively, the system may use the evaluation processes outlined in step S211 of FIGS. 4 and 5.

In step S213, in various embodiments, if the above evaluations of steps 204-211 do not apply the system will check if the temperature is low. In other words, if Tmin<=Tlow, then Tbatt is set to Tmin. Alternatively or additionally, when Thighgap or Tlowgap is less than calibratible value of Tdelta (e.g. default, for example, 3° C.), the battery temperature may be assigned to minimum cell temperature when maximum cell temperature is lower than the Thigh by Tdrop.

In step S215, in various embodiments, if the above evaluations of steps 204-213 do not apply, then the system will check if Tmax>=Thighdrop && Tmax<Thigh. If so, the system will assign the battery temperature as follows: Tbatt=Tmin*(Thigh−Tmax)/Tdrop+Tmax*(Tdrop-(Thigh−Tmax))/Tdrop. If this does not apply, the system may assign the value to Tmin. Alternatively, the system may use the evaluation process outlined in step S215 of FIG. 4.

Figure 4:
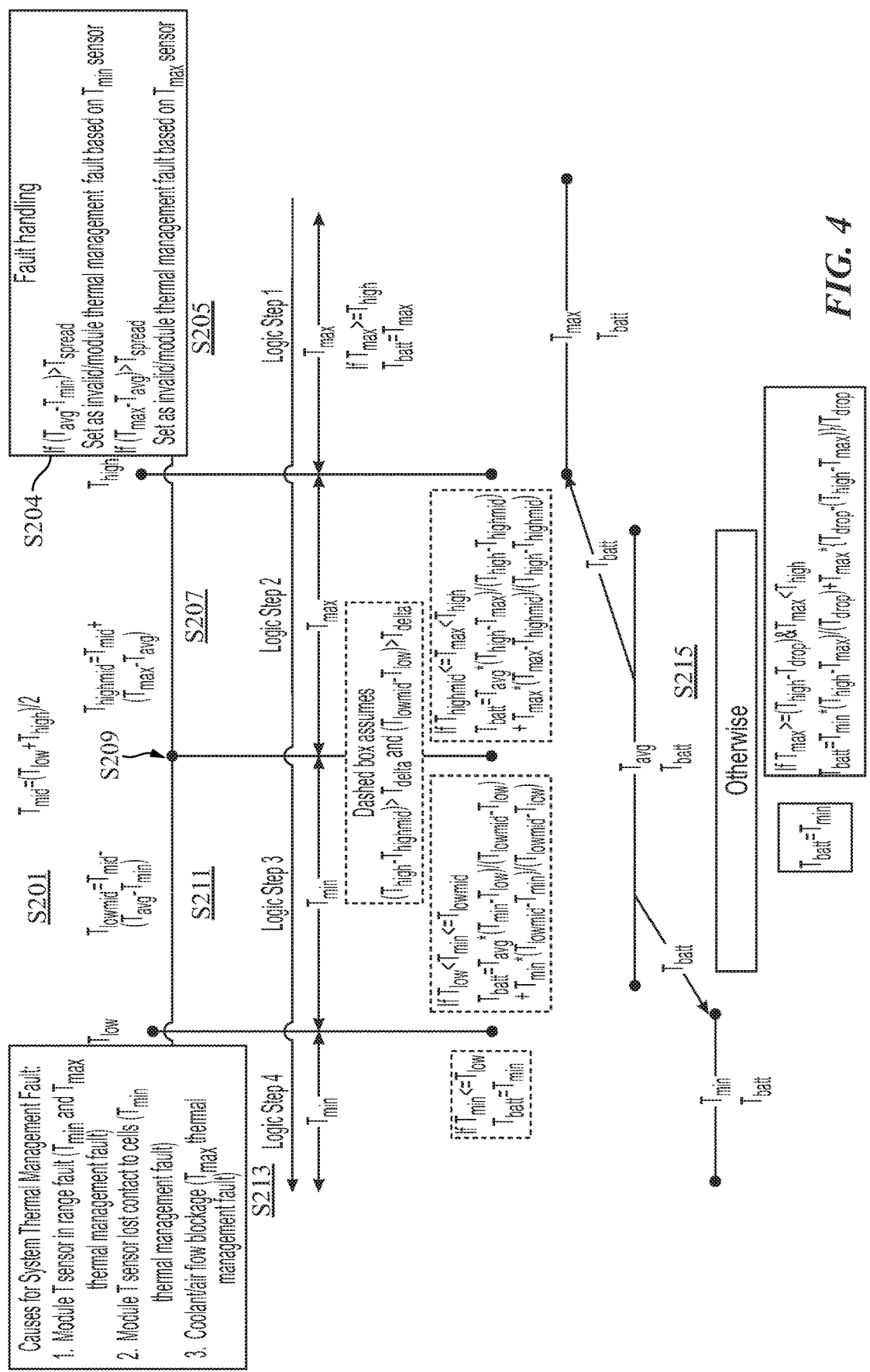
FIG. 4 shows a method for determining battery pack temperature, according to various examples of embodiments.
Figure 5A:
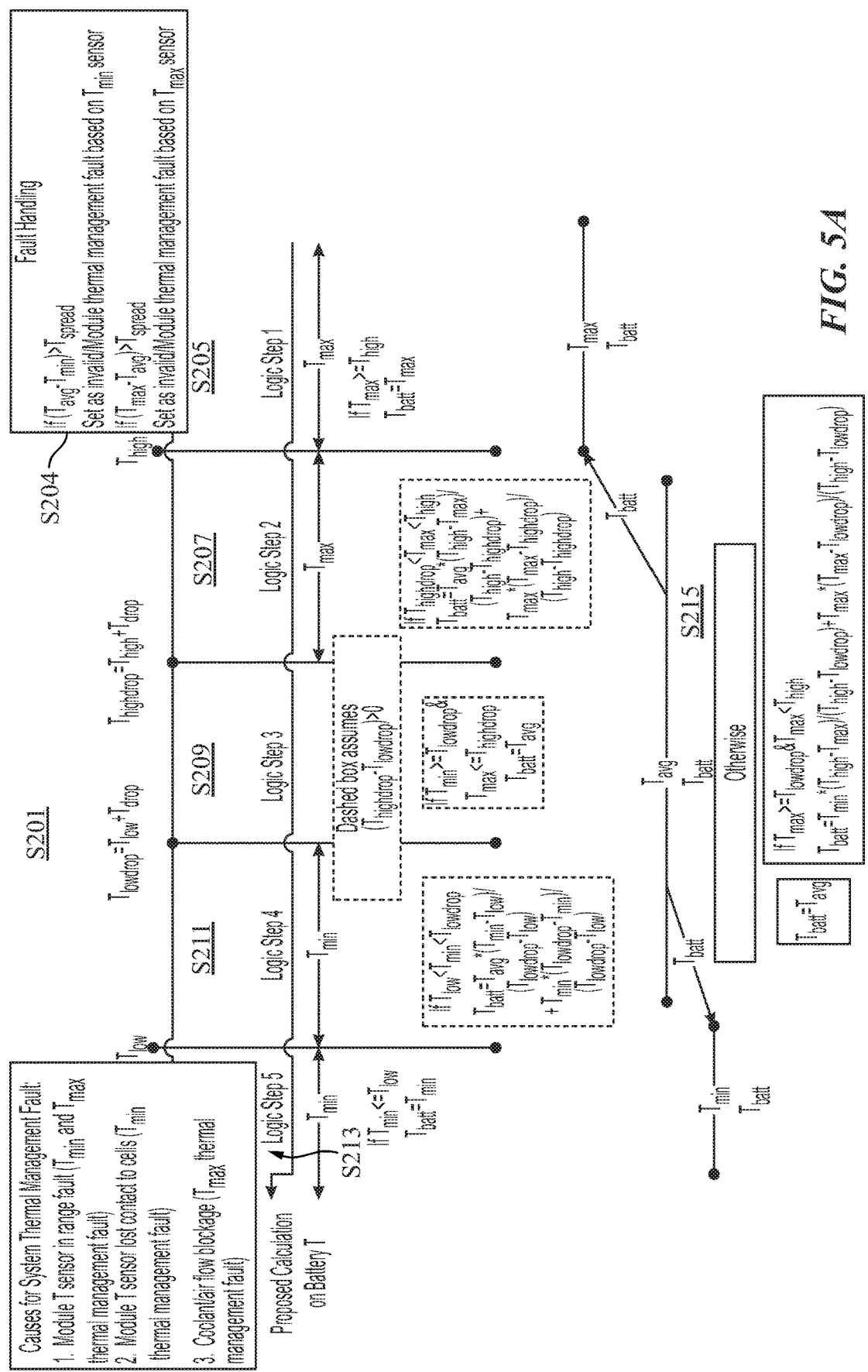
FIG. 5A shows another method for determining battery pack temperature, according to various examples of embodiments.
Figures 1, 5B:
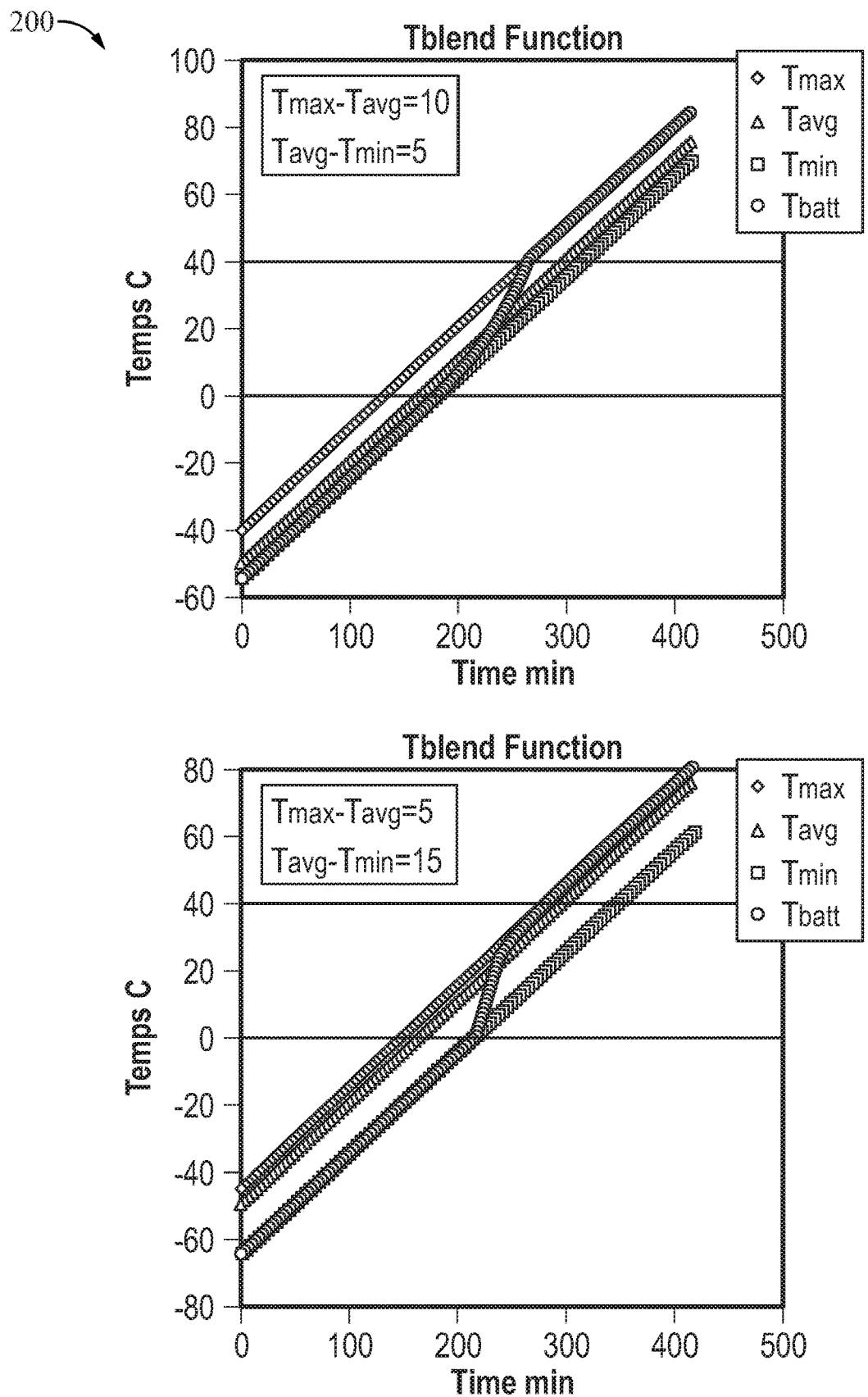
Figure 5B:
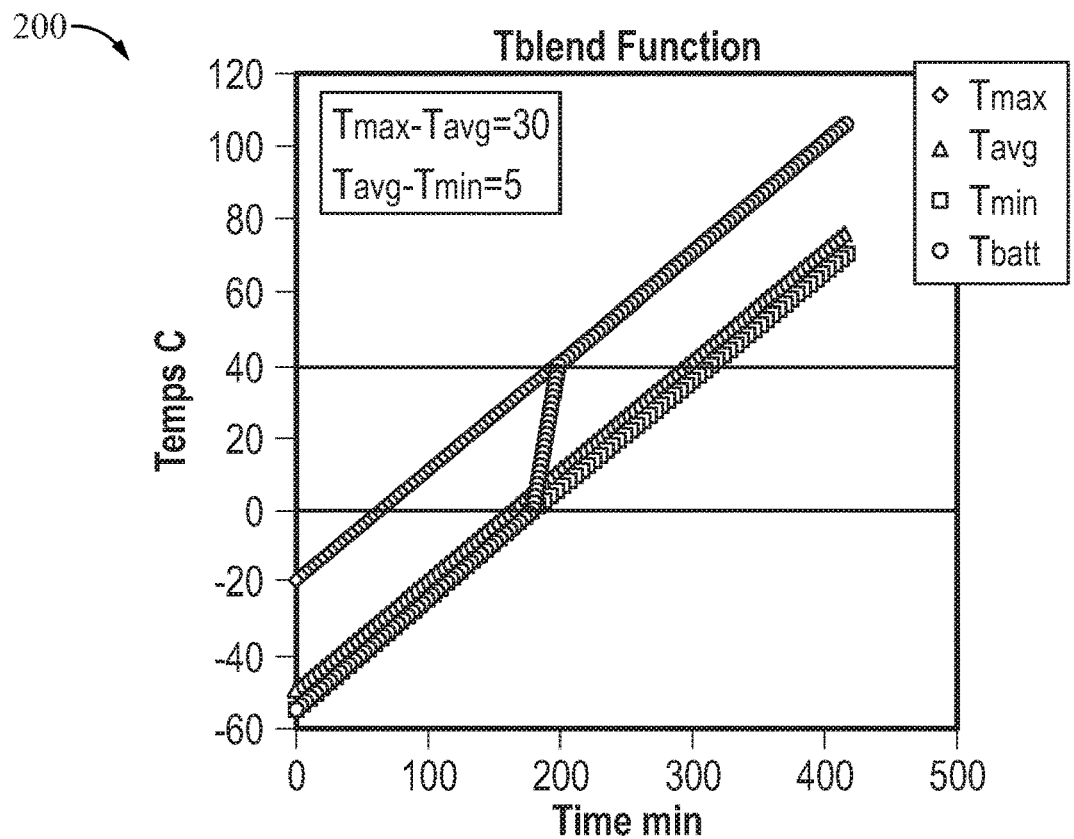
Figure 2:
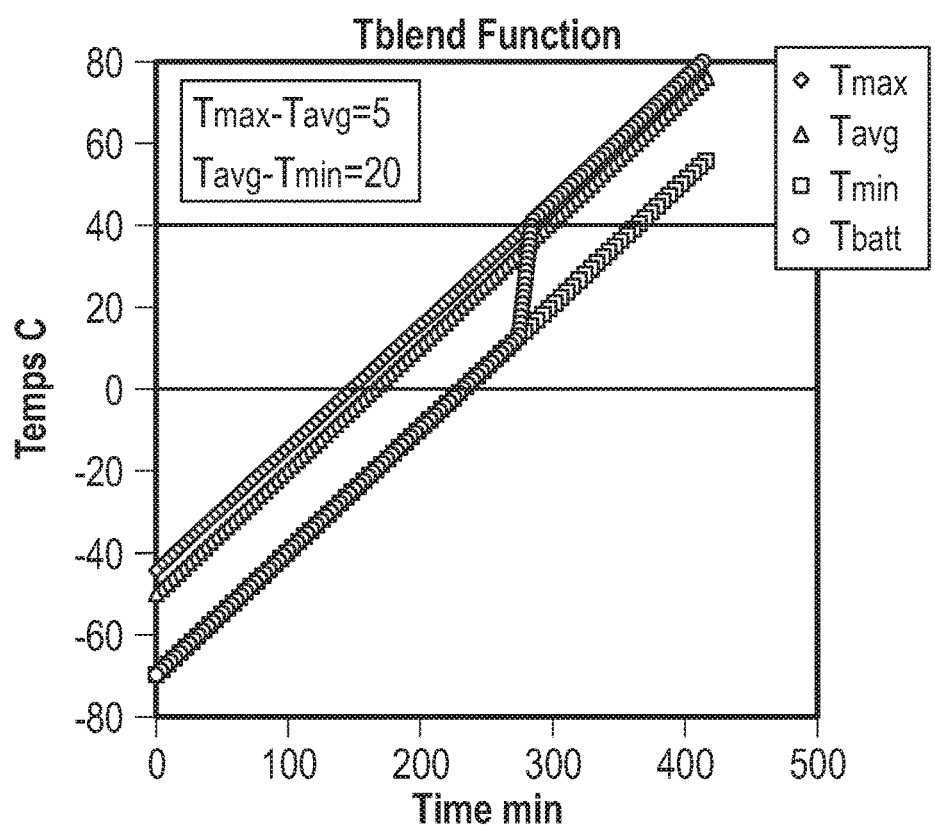
Figure 5B:
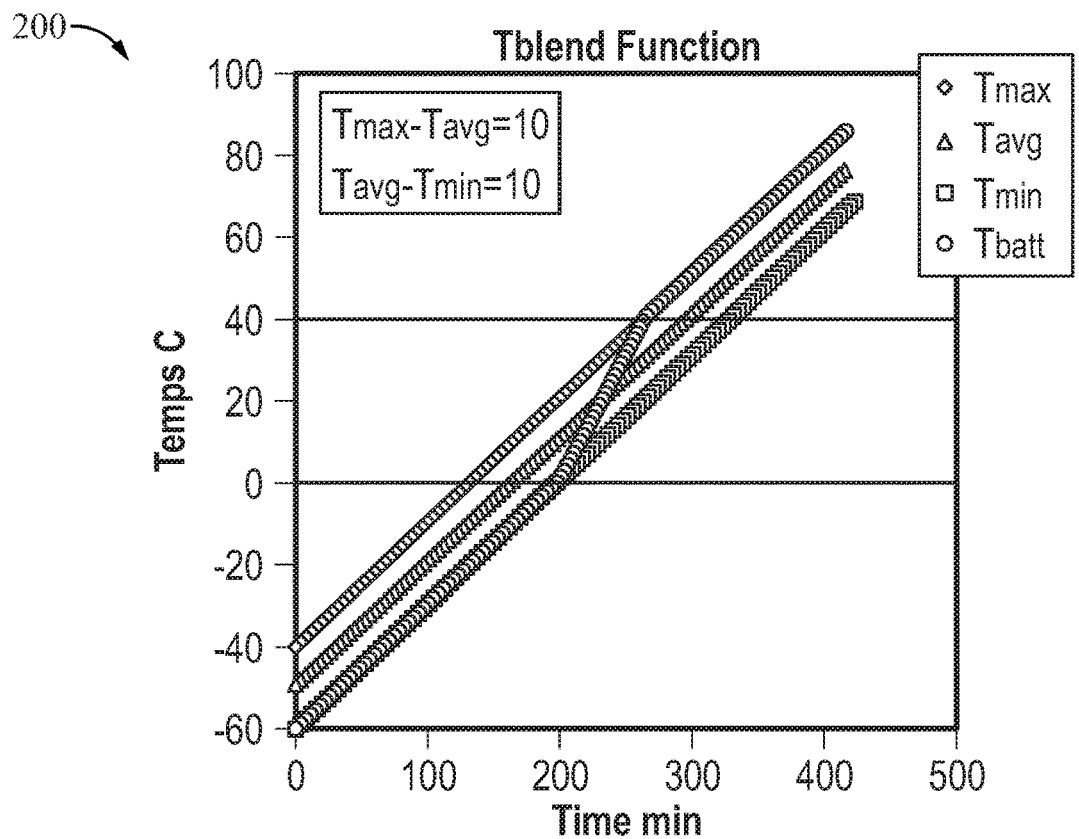
Figure 3:
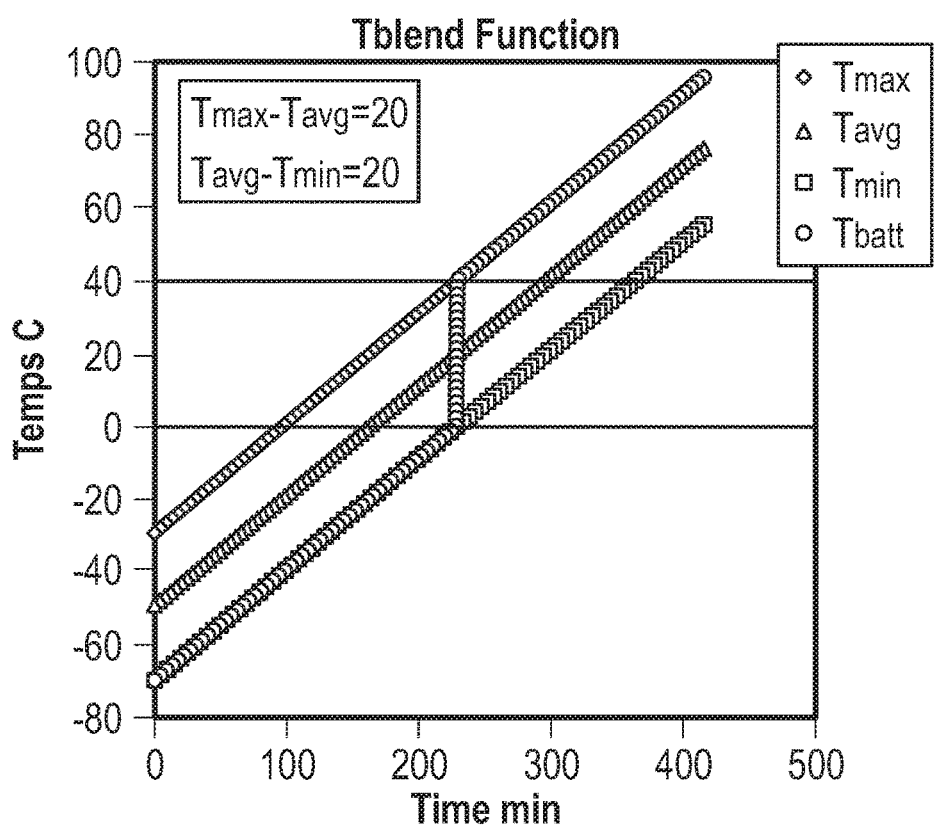

FIGS. 4 and 5A show detailed views of alternative methods for battery temperature calculation. This view shows a more detailed relationship between the assigned values and the ultimate output, Tbatt or fault. As can be seen, steps S205-S213 proceed from evaluating a higher temperature to lower. While the "steps" are presented in a certain order, it should be understood that re-ordering these steps is within the scope of this disclosure.

FIG. 4 shows a method which may assist in producing the battery temperature value. In S201, variables are again defined, which may include but are not limited to the variables defined in connection with FIG. 3. In S203, temperature values may be obtained from each cell in the battery pack. For example, a battery pack may have six cells and temperature values may be taken from each. In S204, fault handling may be evaluated. For example, if Tavg-Tmin exceeds Tspread, the battery/module may be set as invalid/module thermal management fault based on the Tmin sensor. Similarly, if Tmax-Tavg exceeds Tspread, the battery/module may be set as invalid/module thermal management fault based on the Tmax sensor, in various embodiments. System thermal management faults, as noted in FIG. 4, may be caused by a number of factors, including 1. Module T sensor in range fault (Tmax and Tmin thermal management fault), 2. Module T sensor lost contact to cells (Tmin thermal management fault), 3. Coolant/air flow blockage (Tmax thermal management fault).

In S205 of FIG. 4, a maximum value is again assigned to the battery pack value where Tmax is greater than or equal to Thigh. Similarly, in S213, a minimum value is again assigned to the battery pack value where Tmin is less than or equal to Tlow. In S207, if Thighmid is less than or equal to Tmax which is also less than Thigh, the reported temperature of the battery pack will be set to the following: Tavg*(Thigh−Tmax)/(Thigh−Thighmid)+Tmax*(Tmax−Thighmid)/(Thigh−Thighmid). This may be understood as a mid-high battery temperature value. Similarly, in S211, if Tlow is less than Tmin which is less than or equal to Tlowmid, the reported temperature of the battery pack will be set to the following: Tavg*(Tmin−Tlow)/(Tlowmid−Tlow)+Tmin*(Tlowmid−Tmin)/(Tlowmid−Tlow). This may be understood as a mid-low battery temperature value. S209 may, in various embodiments, allow for the assignment of the reported value of the battery to be Tavg where the cell temperature values do reflect a battery pack temperature of Tavg. S207, S209, S211, and S213 may all reflect fulfillment of an assumption where (Thigh−Thighmnid) exceeds Tdelta and (Tlowmid−Tlow) exceeds Tdelta. In S215, an exception case is provided where if Tmax exceeds or is equal to (Thigh−Tdrop) and Tmax is less than Thigh, then reported battery temperature is assigned to Tmin*(Thigh−Tmax)/Tdrop+Tmax*(Tdrop-(Thigh−Tmax))/Tdrop. Otherwise, Tbatt may be assigned to Tmin, in various embodiments.

FIG. 5A shows another method which may assist in producing the battery temperature value. For example, in S207, the system may evaluate if Thighdrop is less than Tmax and Thigh, then Tbatt may be assigned the value of Tavg*(Thigh−Tmax)/(Thigh−Thighdrop)+Tmax*Tmax−Thighdrop)/(Thigh−Thighdrop). This value, in various embodiments, may comprise a mid-high temperature. As another example, in S209, if Tmin is greater than or equal to Tlowdrop and Tmax is less than or equal to Thighdrop, the battery temperature is set to Tavg. In S211, for example, a mid-low value is assigned. In that step, if Tlow is less than Tmin and is less than Tlowdrop, then the battery temperature (Tbatt) is assigned as equal to Tavg*(Tmin−Tlow)/(Tlowdrop−Tlow)+Tmin*(Tlowdrop−Tmin)/(Tlowdrop−Tlow). Steps S207, S209, and S211 may all be assumed to fulfill the criteria of (Thighdrop-Tlowdrop)>0.

In S215 of FIG. 4, a number of alternative values are shown. For example, if Tmax>=Tlowdrop and Tmax is less than Thigh, then the battery temperature (Tbatt) may be assigned as equal to Tmin*(Thigh−Tmax)/(Thigh−Tlowdrop)+Tmax*(Tmax−Tlowdrop)/(Thigh−Tlowdrop). If none of the prior steps apply, Tbatt could be assigned to Tavg, in various embodiments.

In various embodiments, the system and method herein may be a "blended" method of assigning a value to the battery temperature. This may allow for advantages in interaction with vehicle systems, among others. FIGS. 5B-1, 5B-2 and 5B-3 show a number of graphs of battery temperature, displaying example data relative to battery pack temperature measurement. The graphs may use, in various embodiments, the values described in association with the description of FIG. 3. As the example data demonstrates, in various embodiments, the disclosed system and method in various embodiments may allow for flexibility and functionality across a range of measurements. In various embodiments, the disclosed system and method may allow for improved compliance with vehicle requirements.

Figure 6:
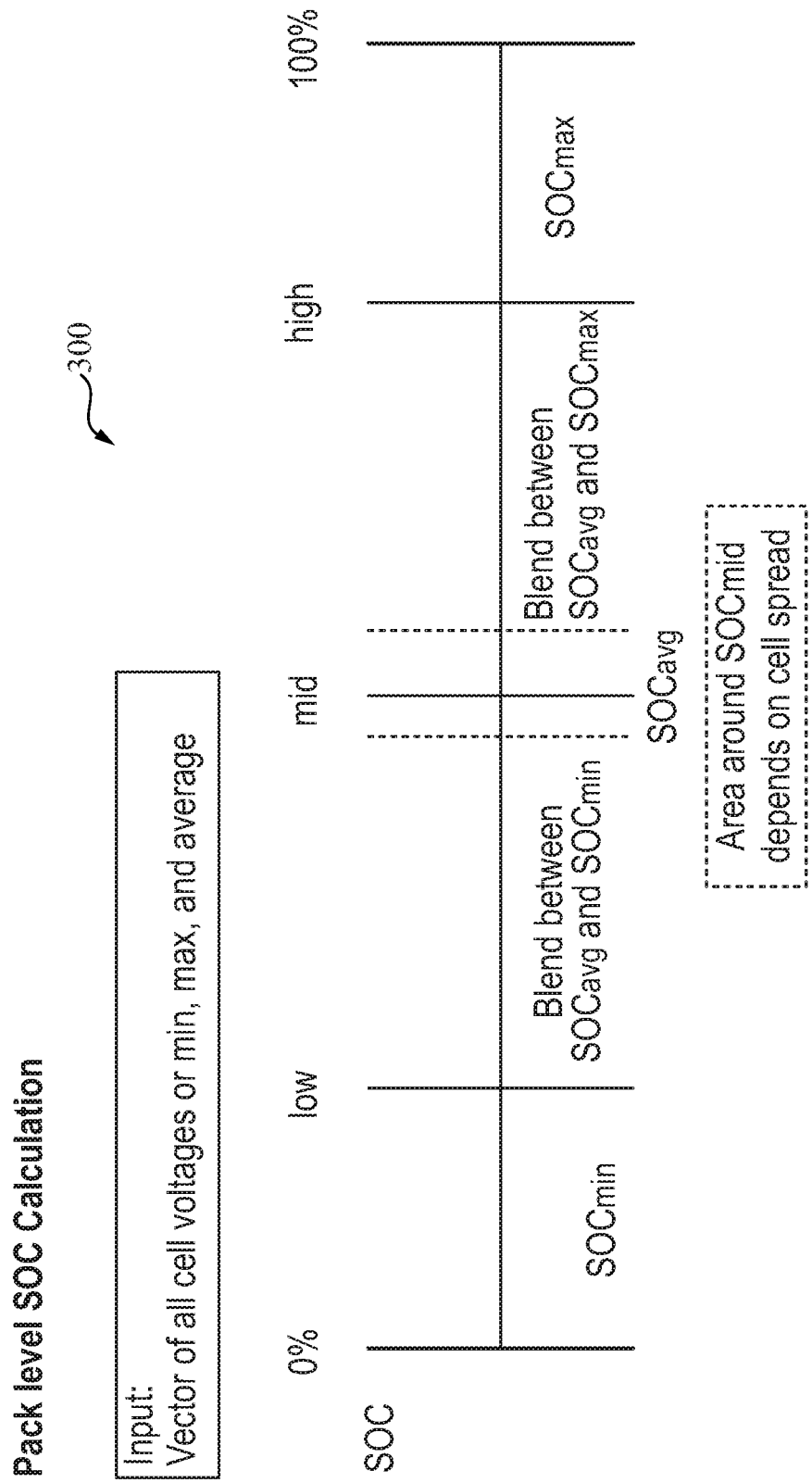
FIG. 6 shows a summary method for determining battery pack state of charge, according to various examples of embodiments.

In addition to providing a battery temperature calculation, the disclosed system and method herein may also provide for a battery state of charge calculation. Again, state of charge may be measured at each cell; therefore, the system may require a single value reflecting the overall battery state of charge. FIG. 6 shows a summarized example of a battery state of charge method. As can be seen, the relative state of charge may impact how the cell-level state of charge measurements are handled. In turn, the method of pack state of charge (overall battery state of charge) may allow for a state of charge value as a proper base for charge or discharge pulse capability assessment. Alternatively, the method of determining pack state of charge (overall battery state of charge) may reflect the remaining amount of discharge ampere hours to a cutoff voltage. In that case, the state of charge minimum value (or minimum of cell SOC values) may be considered. Again, the system may use a "blended" approach, such that while max, min, and average values may be provided, blends between SOCavg and SOCmax (mid-high), as well as SOCavg and SOCmin (mid-low) may also be provided.

Figure 7:
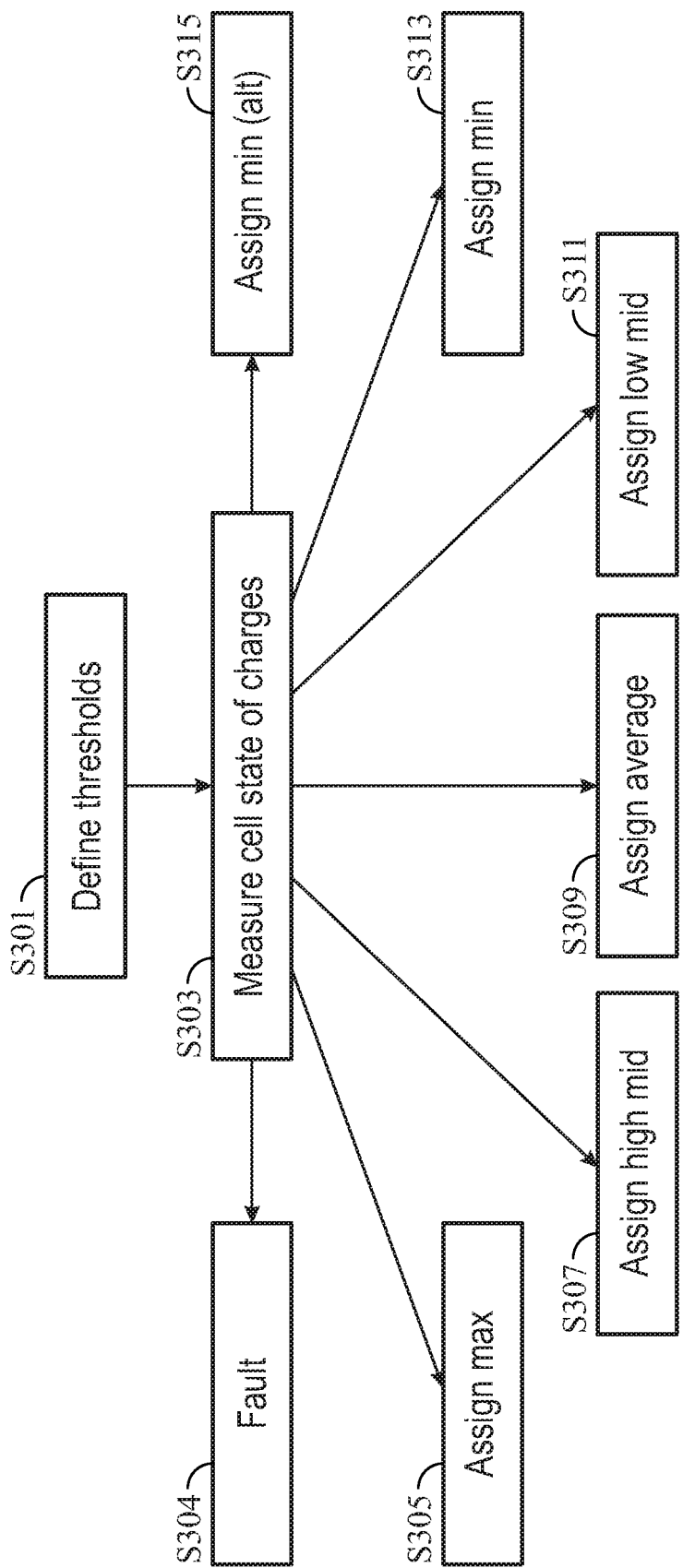
FIG. 7 shows a method for determining battery pack state of charge, according to various examples of embodiments.

Turning to FIG. 7, a First, in step S301, a method for determining overall battery SOC is shown. First, in step S301, variables or calibration values are defined. These may include:
1. SOChigh: A high SOC threshold above which the battery SOC may be set to maximum cell SOC (SOCmax). The high SOC threshold may be set to the SOC value above which the system performance (e.g. power or current limits) start to decrease significantly. This may constitute a percentage in a range from 0 to 120%. In various embodiments, the range may be between 50-70 percent.
2. SOClow: A low SOC threshold may comprise a level below which the battery S(X may be set to equal minimum cell SOC (SOCmin) if maximum cell SOC is also below the high SOC threshold. The low SOC threshold may be set to the SOC value below which the system performance (e.g. power or current limits) start to decrease significantly. This may constitute a percentage in a range from 0 to 120%. In various embodiments, the range may be between 30-60 percent.
3. SOCspread: If the difference between maximum cell SOC and average cell S(X is higher than this value, a fault or error may be set to indicate system imbalance fault based on maximum cell SOC. If different between minimum SOC and average cell S(X is higher than this value, a fault may be set to indicate a system imbalance fault based on minimum cell SOC. SOCspread may be the maximum possible delta S(X estimated by SOC accuracy modeling for a poor operating situation. The value range may be from 0% to 100% and more particularly from 0% to 30%.
4. SOCdrop and SOCdelta: In various embodiments, when SOChighgap or SOClowgap is less than calibratible value of SOCdelta (e.g. 0% to 20% and more particularly 0% to 10%), the battery SOC may be set equal to minimum cell SOC when maximum cell SOC is lower than the SOChigh by SOCdrop (e.g. 0% to 20% and more particularly 0% to 10%). SOChighgap and SOClowgap can be calculated by following equations: SOCmid=(SOClow+SOChigh)/2; SOClowmid=SOCmid−(SOCavg−SOCmin); SOChighmid=SOCmid+(SOCmax−SOCavg); SOChighgap=SOChigh−SOChighmid; SOClowgap=SOClowmid−SOClow; the calibratable parameter SOCdrop may define the allowed SOC difference between SOChigh and SOChighdrop. SOCdrop may comprise the minimum delta of cell maximum SOC below high SOC threshold, where the blended SOC may need to shift towards the maximum cell SOC value. SOCdelta may be greater than or equal than SOCdrop. This value may be used to select the blended SOC calculation algorithm. Here, the percentage range may be from 0% to 120%.
5. SOChighdrop may be understood as SOChigh−SOCdrop.
6. SOClowdrop may be understood as SOClow+SOCdrop.

Next, in step S303, measurements of the cell SOC (in other words, measurement of SOC from each cell) is obtained, and further variables are defined. For example, this may include a maximum measured SOC, SOCmax, which may be determined by the maximum obtained state of charge of the plurality of cells. The minimum cell temperature, SOCmin, may be understood as the minimum obtained cell temperature of the plurality of cells. A mid (i.e. middle) value, SOCmid, may be determined by an average of SOClow and SOChigh. In other words, SOCmid=−SOClow+SOChigh)/2. An average temperature, SOCavg, may be determined by averaging all obtained cell state of charge readings. Given these base values, the following values may also be defined or assigned by the system, in various embodiments:
1. A low mid value, SOClowmid, may be determined as follows:
   SOClowmid=SOCmid−(SOCavg−SOCmin)
2. A high mid value, SOChighmid, may be determined as follows:
   SOChighmid=SOCmid+(SOCmax−SOCavg)
3. A high gap value, SOChighgap, may be determined as follows:
   SOChighgap=SOChigh−SOChighmid;
4. A low gap value, SOClowgap, may be determined as follows:
   SOClowgap=SOClowmid−SOClow: and
5. A high drop value, SOChighdrop, may be determined as follows:
   SOChighdrop=SOChigh−SOCdrop.

An example logic for assigning the battery SOC is as follows:
1. if SOCmax>=SOChigh
2. SOCbatt=SOCmax;

This step, S305, may assign the battery SOC to SOC maximum where the SOCmax is greater than or equal to SOChigh.

3. elseif (SOChighdrop−SOClowdrop)>0
4. if SOCmax>SOChighdrop && SOCmax<SOChigh
5. SOCbatt=SOCavg*(SOChigh−SOCmax)/(SOChigh−SOChighdrop)+SOCmax*(SOCmax−SOChighdrop)/(SOChigh−SOChighdrop);

This step. S307, establishes a mid-high or mid-high value for SOCbatt where the SOCmax is greater than SOChighdrop and SOCmax is less than SOChigh.

6. elseif SOCmin>=SOClowdrop && SOCmax<=SOChighdrop
7. SOCbatt=SOCCavg;

This step, S309, assigns an average SOC to SOC battery where the SOCmin (SOCminimum) is greater than or equal to SOClowdrop and SOCmax is less than or equal to SOChighdrop.

8. elseif SOCmin>SOClow && SOCmin<SOClowdrop
    9. SOCbatt=SOCavg*(SOCmin-SOClow)/(SOClowdrop-SOClow)+SOCmin*(SOClowdrop-SOCmin)/(SOClowdrop-SOClow);

This step, S311, assigns a mid-low value to SOC battery where the SOCmin is greater than SOClow and SOCmin is less than SOClowdrop.

10. else
11. if SOCmax>=SOClowdrop && SOCmax<SOChigh
12. SOCbatt:=SOCmin*(SOChigh-SOCmax)/(SOChigh-SOClowdrop)+SOCmax*(SOCmax-SOClowdrop)/(SOChigh-SOClowdrop);

This step, S315, assigns a modified minimum to SOC battery (SOCbatt).

13. SOCbatt=SOCmin;

In step S313, the battery is assigned to a minimum.

Figure 8A:
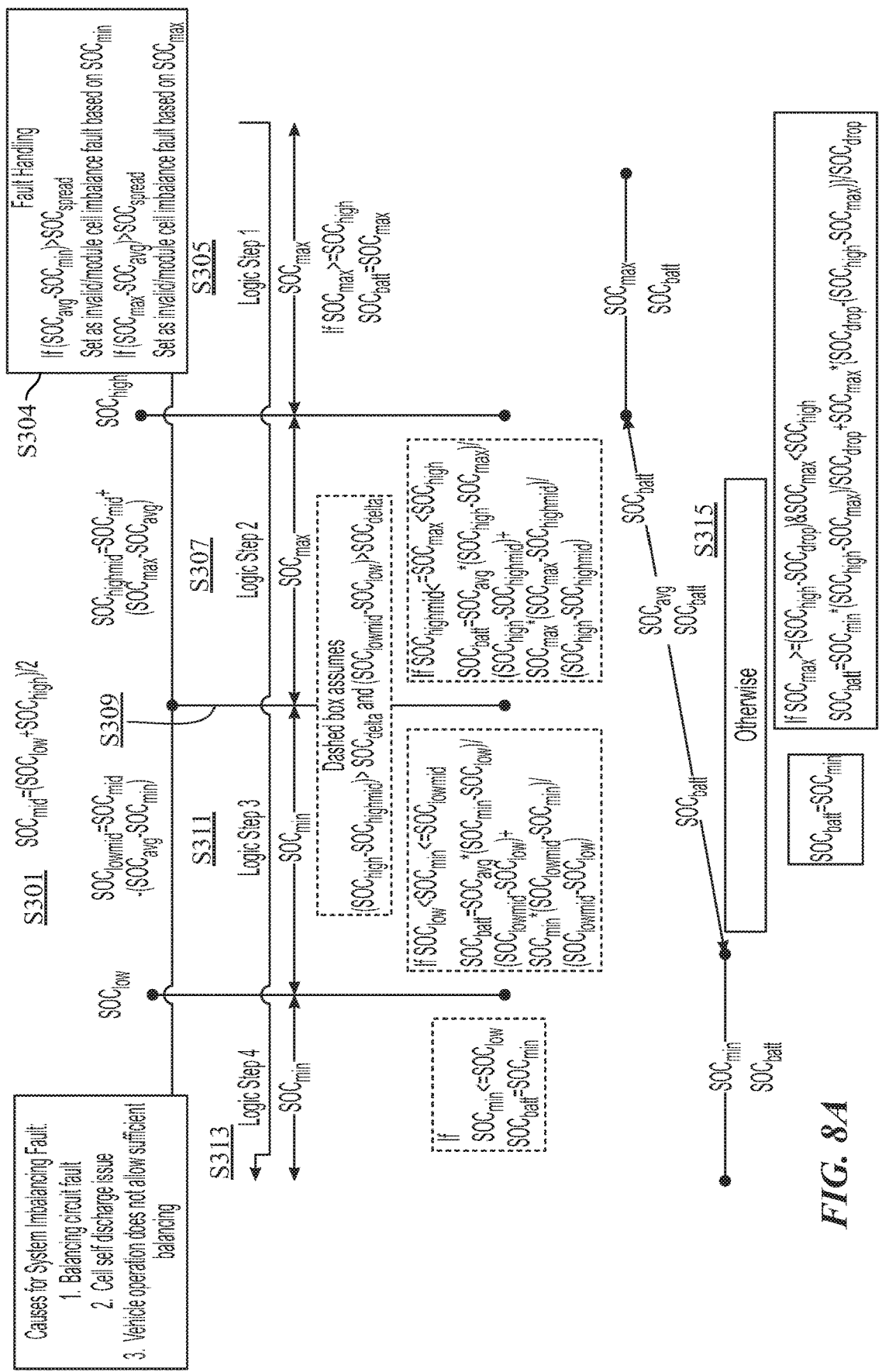
FIG. 8A shows a method for determining battery pack state of charge, according to various examples of embodiments.
Figure 9A:
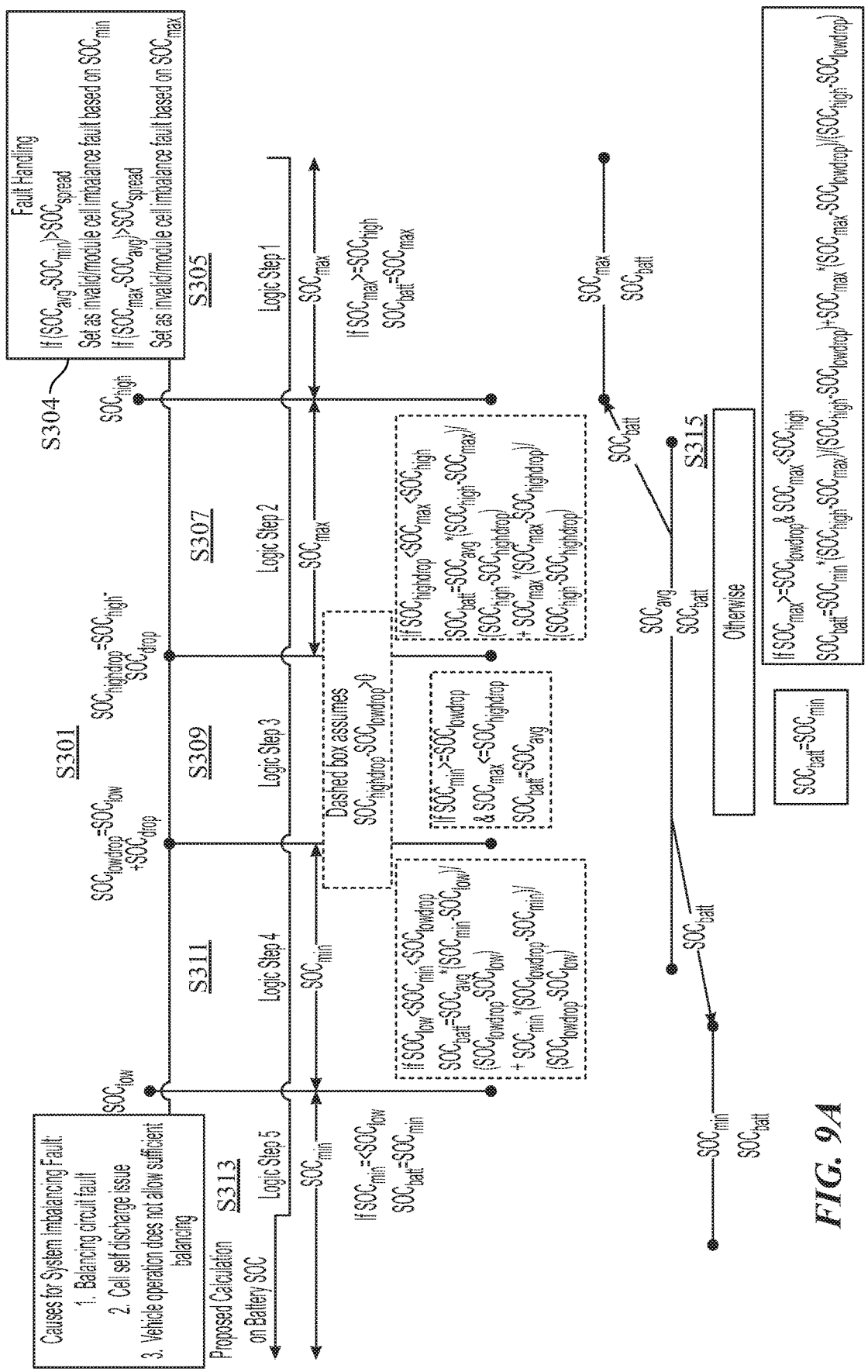
FIG. 9A shows a method for determining battery pack state of charge, according to various examples of embodiments.

14. if SOCmin<=SOClow
15. SOCbatt=SOCmin;

Similarly, turning to S315 in FIGS. 7, 8A, and 9A, SOCmin may be assigned as a default when other criteria do not apply.

FIG. 8A shows another method for calculating battery state of charge, according to various embodiments. In FIG. 8A, the steps of FIG. 7 are likewise shown with accompanying calculations and values. In that Figure, the assigned battery temperature can be seen from left (e.g. S313) to right (e.g. S305) proceeding from low to high. It should likewise be understood that S305, S307, S309, S311, S313 and S315 may be understood as criteria in the alternative, that is, the criteria may be evaluated and assigned exclusively.

Exceptions to these ranges are located at the bottom of the page ("otherwise") and may be referenced as S315. As a number of example, but not limiting thresholds, SOChigh may be 50-70%, SOC low may be 30-50%, SOC drop may be 5-15%, and SOC delta may be 5-15%. A number of variables may be defined, for example in S301, including:

1. SOCmid=(SOClow+SOChigh)/2;
2. SOClowmid=SOCmid-(SOCavg-SOCmin);
3. SOChighmid=SOCmid+(SOCmax-SOCavg);
4. SOChighgap=SOChigh-SOChighmid;
5. SOClowgap=SOClowmid-SOClow;
6. SOChighdrop=SOChigh-SOCdrop;

SOC values of each cell may be obtained in S303 and fault handling may be defined in step S304. For example, if (SOCavg-SOCmin) exceeds SOCspread, the battery pack output may be set as invalid/module cell imbalance fault based on SOCmin. Similarly, if (SOCmax-SOCavg) exceeds SOCspread, the battery pack output may be set as invalid/module cell imbalance fault based on SOCmax. In S305, the system may evaluate if SOCmax>=SOChigh and, if so, assign SOCbatt=SOCmax. Steps S307, S309, S311, and S313 may require SOChighgap to be greater than SOCdelta and SOClowgap>SOCdelta. In S307, if SOCmax>=SOChighmid and SOCmax<SOChigh. SOCbatt (battery SOC output to vehicle) may be assigned to the value: SOCavg*(SOChigh-SOCmax)/(SOChigh-SOChighmid)+SOCmax*(SOCmax-SOChighmid)/(SOChigh-SOChighmid). This may be understood as a mid-high SOC battery value.

In step S311, in various embodiments, if SOCmin<=SOClowmid and SOCmin>SOClow, then SOCbatt (battery SOC output to vehicle) may be assigned to the value SOCavg*(SOCmin-SOClow)/(SOClowmid-SOClow)+SOCmin*(SOClowmid-SOCmin)/(SOClowmid-SOClow). In S313, if SOCmin is equal to or less than SOClow, SOCbatt (battery SOC output to vehicle) may be assigned to the value SOCmin. This may be understood as a mid-low SOC battery value.

In various embodiments, there may be a point of S309 where battery cell output is such that SOCbatt is assigned to SOCavg (an average S(X battery value). For example, this may be true where if there is a condition falling between S307 and S311.

In S315, an "otherwise" conditions are provided. In those instances, if SOCmax exceeds or is equal to SOChighdrop and SOCmax is less than SOChigh, SOCbatt (battery SOC output to vehicle) may be assigned to the value SOCmin*(SOChigh-SOCmax)/SOCdrop+SOCmax*(SOCdrop-(SOChigh-SOCmax))/SOCdrop. Otherwise, SOCbatt (battery SOC: output to vehicle) may be assigned to the value SOCmin.

Figure 8B:
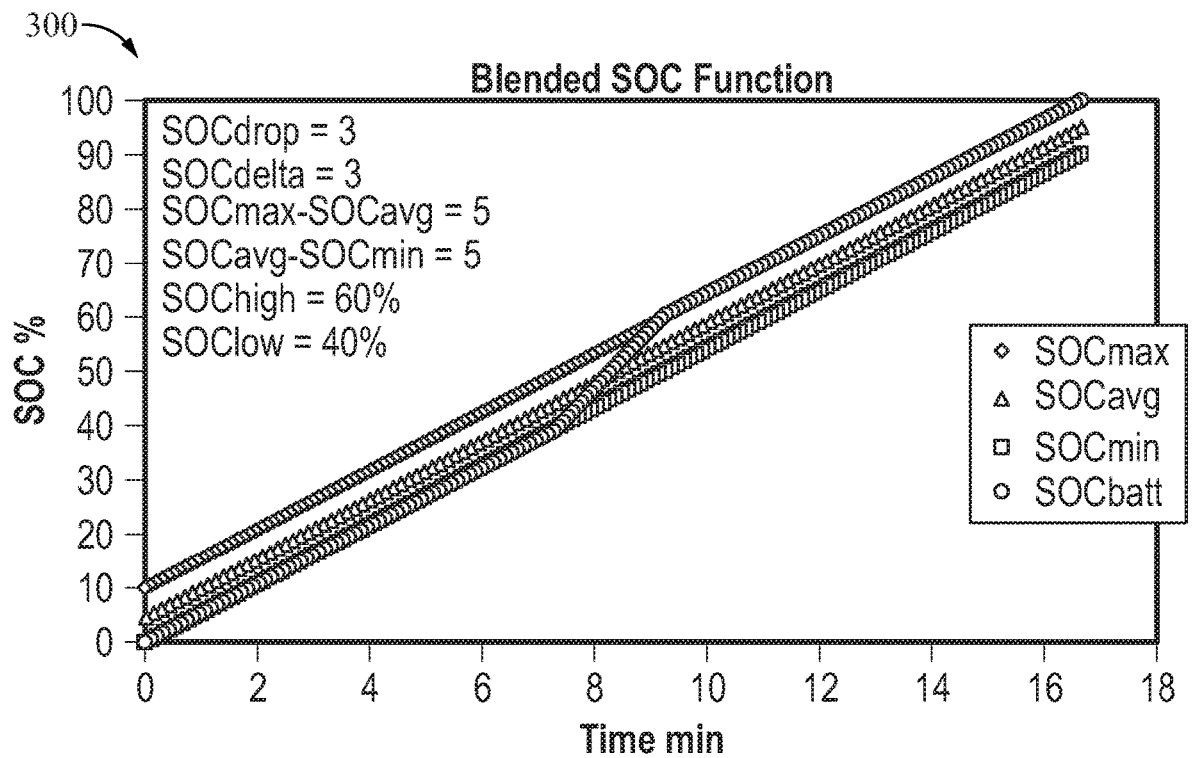
Figure 1:
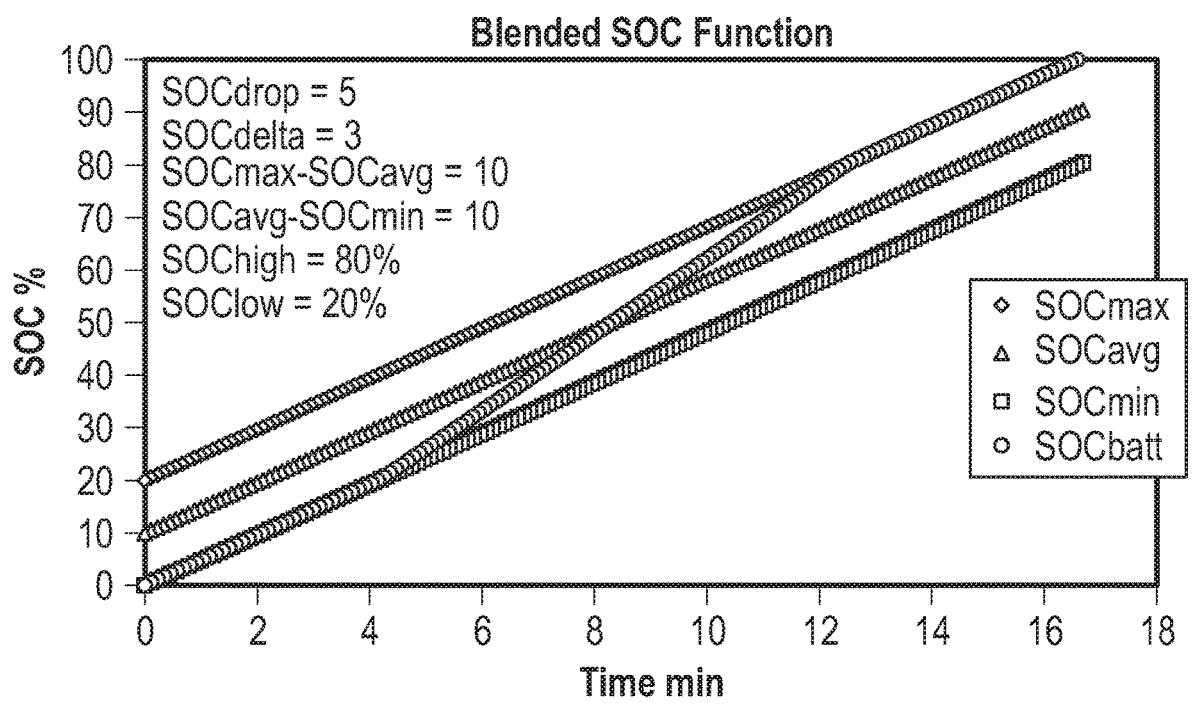

In FIGS. 8B-1 and 8B-2, a number of graphs using the system and method herein, particularly implementing FIG. 8A, to achieve blended SOC measurements are shown. These graphs use the system and methods herein and reflect advantages of the disclosed system and method, particularly in offering flexibility to determine how the battery SOC (blended SOC) may be calculated.

FIG. 9A shows another method for calculating battery state of charge, according to various embodiments. In FIG. 9A, the steps of FIG. 7 are likewise shown with accompanying calculations and values. Similarly to FIG. 8A, in FIG. 9A, the assigned battery temperature can be seen from left (e.g. S313) to right (e.g. S305) proceeding from low to high. Exceptions to these ranges are located at the bottom of the page ("otherwise") and may be referenced as S315. In S305, the system may assign the battery SOC to SOC maximum where SOCmax is greater than or equal to SOChigh.

Steps S307, S309, and S311 assume that SOChighdrop-SOClowdrop exceeds or is greater than zero. It should likewise be understood that S305, S307, S309, S311, S313 and S315 may be understood as criteria in the alternative, that is, the criteria may be evaluated and assigned exclusively.

In S307 a mid-high SOC battery value may be assigned if SOChighdrop is less than SOCmax and is less than SOChigh. Then, SOCbatt is assigned the value of SOCavg*(SOChigh-SOCmax)/(SOChigh-SOChighdrop)+SOCmax*(SOCmax-SOChighdrop)/SOChigh-SOChighdrop).

In S309 an average SOC battery value may be assigned if the SOCmin is greater than or equal to SOClowdrop and SOCmax is less than or equal to SOChighdrop. In that case, SOCbattery may be assigned to SOCaverage.

In S311, a low mid SOC battery value may be assigned. In that case, if SOClow is less than SOCmin which is also less than SOClowdrop, then SOCbatt may be assigned the value of: SOCavg*(SOCmin-SOClow)/SOClowdrop-SOClow)+SOCmin*(SOClowdrop-SOCmin)/(SOClowdrop-SOClow).

In S313, if SOCmin is equal to or less than SOClow, SOCbatt may be assigned to SOCmin.

In S315 a number of exceptions are provided. In that case, if SOCmax is greater than or equal to SOClowdrop and SOCmax is less than SOChigh, then SOCbatt may be assigned the value of SOCmin*(SOChigh-SOCmax)/(SOChigh-SOClowdrop)+SOCmax*(SOCmax-SOClowdrop)/(SOChigh-SOClowdrop). If this criteria is likewise unfulfilled, then SOCbatt may be assigned to SOCmin.

Figures 2, 8B:
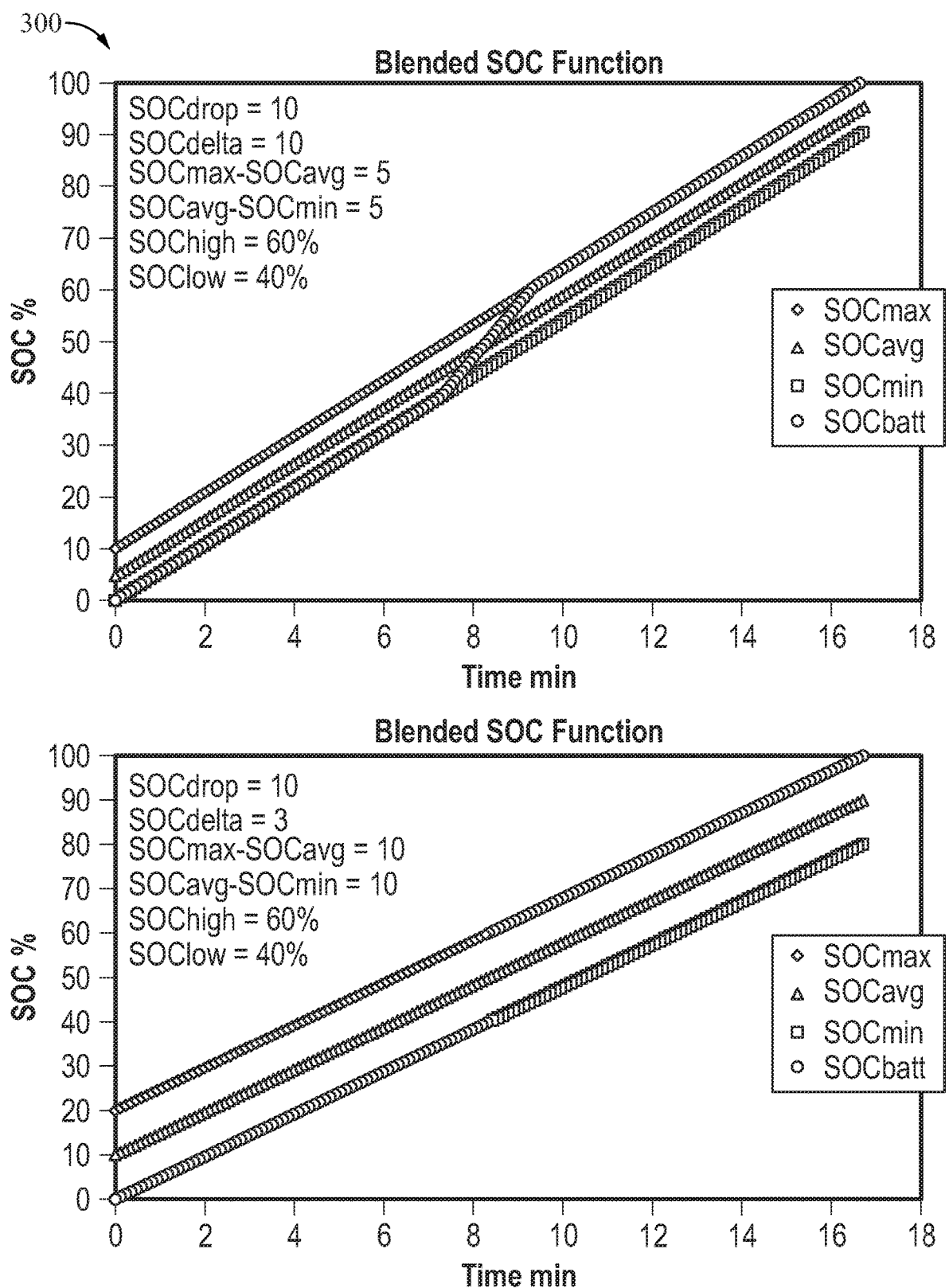

In step S304 provided in both FIGS. 7 and 8, fault conditions are checked. Faults may occur for a number of reasons and have a number of identifying attributes. For example, as shown in FIG. 8, there may be a number of causes for a system imbalancing fault. These may include a balancing circuit fault, a cell self-discharge issue, or vehicle operation may not allow for sufficient balancing. A cell imbalance fault may be identified, for example, in step S304. For example, if (SOCavg-SOCmin) is greater than or exceeds SOCspread, an invalid/module cell imbalance fault based on SOCmin may be identified. As another example, if (SOCmax-SOCavg) is greater than or exceeds SOCspread, an invalid/module cell imbalance fault based on SOCmax may be identified. A system imbalance fault may be identified if the maximum cell SOC is higher than mean cell SOC for more than a calibratible amount or if minimum cell SOC is lower than mean cell SOC for more than a calibratible amount.

Figures 1, 9B:
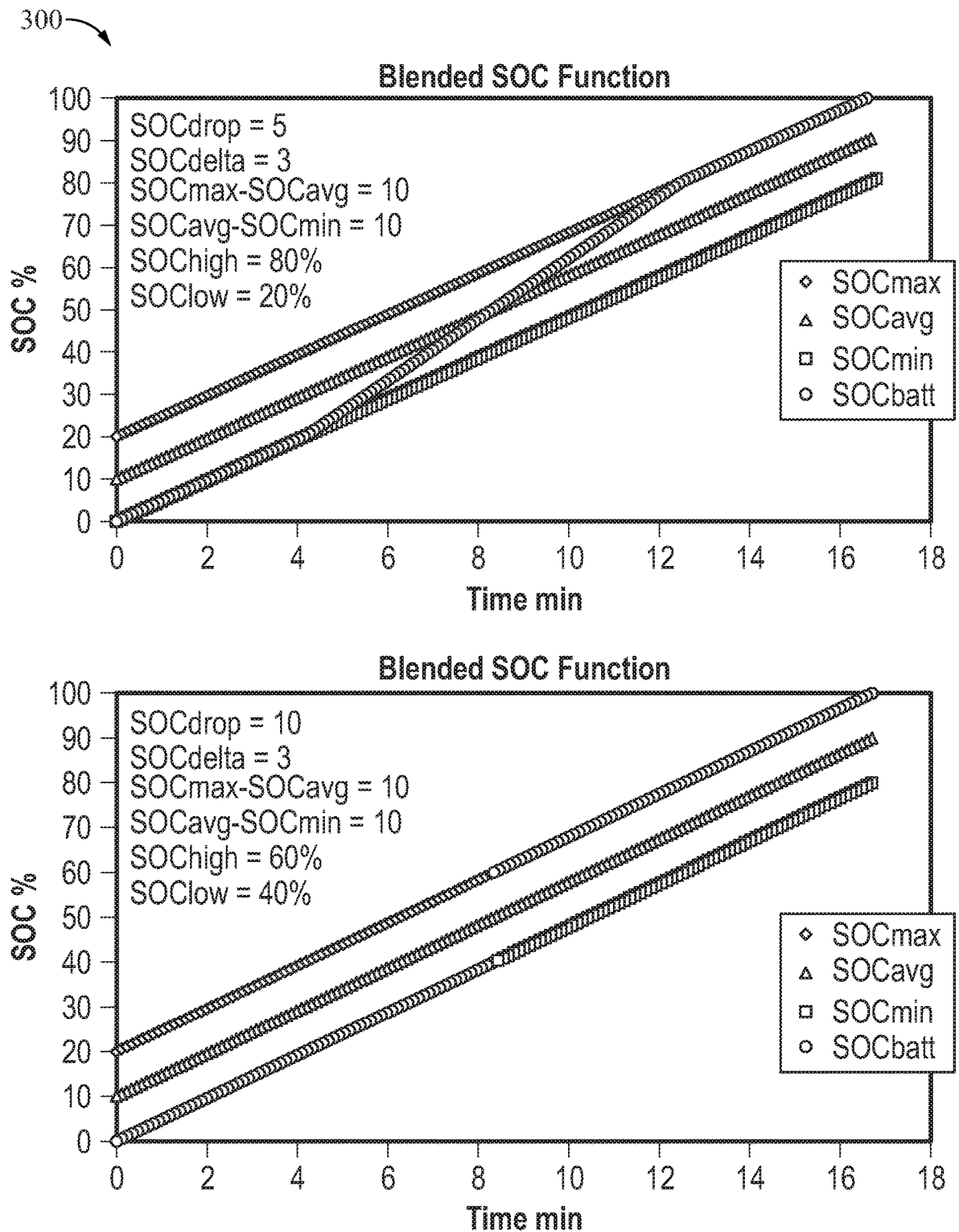
Figures 2, 9B:
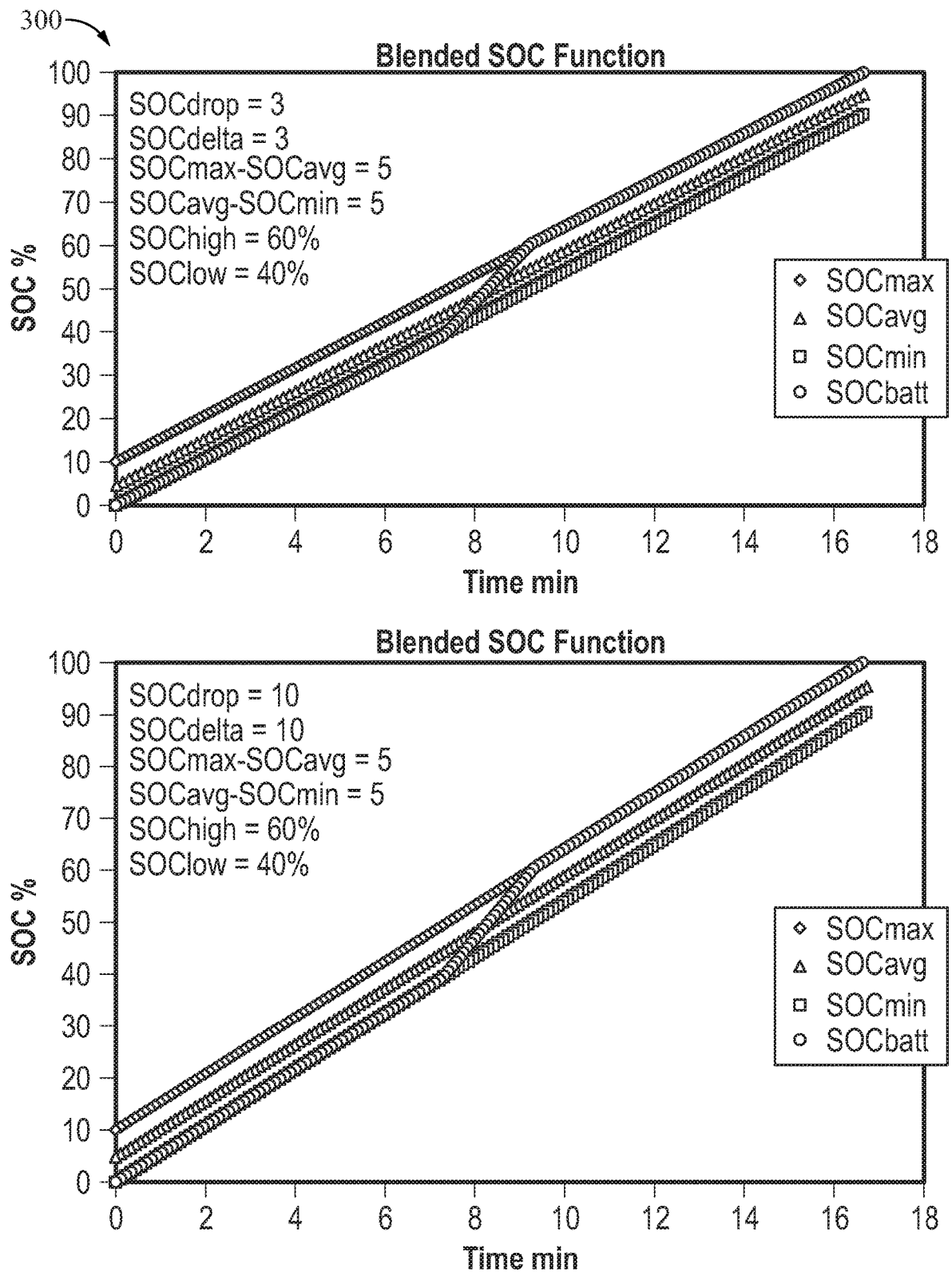

In FIGS. 9B-1 and 9B-2, a number of graphs using the system and method herein, particularly implementing FIG. 9A, to achieve blended SOC measurements herein are shown. These graphs use the system and methods herein and reflect advantages of the disclosed system and method, particularly in offering flexibility to determine how the battery SOC (blended SOC) may be calculated.

Various examples of embodiments of the systems, devices, and methods according to this invention are described in detail in reference to the attached documentation. For example, a system and method for determining battery pack temperature and SOC: is provided. A plurality of temperature readings may be obtained using, for example, temperature sensors provided within a battery system. These readings may be provided to a battery management system, in various embodiments. The battery management system may include a processor which may process the readings using the system and method herein. A single, for example, blended temperature value may be output to the vehicle by the battery management system. This value may overcome disadvantages of previous systems and methods, for example by providing an improved calculation of overall battery temperature. Similarly, a plurality of state of charge (SOC) readings may be obtained using, for example, SOC sensors provided within a battery system. These readings may be provided to a battery management system, in various embodiments. The battery management system may include a processor which may process the readings using the system and method herein. A single, for example, blended SOC value may be output to the vehicle by the battery management system. This value may overcome disadvantages of previous systems and methods, for example by providing an improved calculation of overall battery SOC.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The system may also include computer-readable media which may include any computer-readable media or medium that may be used to carry or store desired program code that may be accessed by a computer. The invention can also be embodied as computer-readable code on a computer-readable medium. To this end, the computer-readable medium may be any data storage device that can store data.

The software system described herein may include a mixture of different source codes. The system or method herein may be operated by computer-executable instructions, such as but not limited to, program modules, executable on a computer. Examples of program modules include, but are not limited to, routines, programs, objects, components, data structures, and the like which perform particular tasks or implement particular instructions. The software system may also be operable for supporting the transfer of information within a network.

The technical effects and technical problems in the specification are exemplary and are not limiting. It should be noted that the embodiments described in the specification may have other technical effects and can solve other technical problems. Aspects of the method described herein are implemented on a software system running on a computer system. To this end, the methods and system may be implemented in, or in association with, a general-purpose software package or a specific purpose software package. As a specific, non-limiting example, the device could be a battery management system in communication with a battery vehicle.

We claim:

1. A battery system comprising:
   a. a battery pack having a plurality of cells, each of the plurality of cells each having a cell temperature such that the battery pack comprises a plurality of cell temperatures;
   b. a battery management system coupled to the battery pack and designed to obtain the plurality of cell temperatures from the battery pack and output a single battery temperature (Tbatt), the battery management system defining:
      i. a high temperature threshold value (Thigh);
      ii. a low temperature threshold value (Tlow); and
      iii. a temperature drop value (Tdrop);
   c. wherein the battery management system is configured to:
      i. using the plurality of cell temperatures, determine:
         a maximum value (Tmax) for the plurality of cell temperatures;
         a minimum value (Tmin) for the plurality of cell temperatures;
         a mid value (Tmid) for the plurality of cell temperatures;
         a high-middle value (Thighmid) based on the maximum value (Tmax) and the mid value (Tmid); and
         a low-middle value (Tlowmid) based on the minimum value (Tmin) and the mid value (Tmid);
      ii. if a first criteria is satisfied, assign the maximum value (Tmax) to the battery temperature (Tbatt;
      iii. if a second criteria is satisfied but not the first criteria, assign the high-middle value (Thighmid) to the battery temperature (Tbatt);
      iv. if a third criteria is satisfied but not the first or second criteria, assign the low-middle value (Tlowmid) to the battery temperature (Tbatt);
      v. if a fourth criteria is satisfied but not the first, second, or third criteria, assign the minimum value (Tmin) to the battery temperature; and
      vi. output the single battery temperature (Tbatt).

2. The system of claim 1, wherein the battery management system is further configured to use the cell temperature of each of the plurality of cells and one or more of the high temperature threshold value (Thigh), the low temperature threshold value (Tlow), and the temperature drop value (Tdrop) to determine if there is a battery fault or error.

3. The system of claim 1, wherein the battery management system is further configured to assign the minimum value (Tmin) to the battery temperature (Tbatt) when none of the criteria are fulfilled.

4. The system of claim 1, wherein the battery management system is further configured to assign an average value (Tavg) to the battery temperature (Tbatt) when none of the criteria are fulfilled.

5. The battery system of claim 1, wherein the battery system is configured to obtain a state of charge from each of the plurality of cells.

6. The battery system of claim 5, wherein the battery management system is further configured to evaluate the state of charge from each of the plurality of cells against certain criteria.

7. The battery system of claim 6, wherein the battery management system outputs a single state of charge for the battery.

8. A method of determining battery pack temperature using the system of claim 1.

9. A system for determining battery pack state of charge, the system comprising:
   a. a battery management system coupled to the battery pack and designed to obtain a plurality of state of charge readings from a plurality of cells and output a single battery state of charge (SOC), the battery management system defining:
      i. a high state of charge threshold value (SOChigh);
      ii. a low state of charge threshold value (SOClow);
      iii. a state of charge drop value (SOCdrop):
   b. wherein the battery management system is further configured to:
      i. if a first criteria is satisfied, assign the maximum value (SOCmax) to the battery state of charge (SOCbatt);
      ii. if a second criteria is satisfied but not the first criteria, assign a mid-high value (SOCmidhigh) to the battery state of charge (SOCbatt);
      iii. if a third criteria is satisfied but not the first or second criteria, assign an average value (SOCavg) to the battery state of charge (SOCbatt);
      iv. if a fourth criteria is satisfied but not the first, second, or third criteria, assign a mid-low (SOCmidlow) value to the battery state of charge (SOCbatt);
      v. if a fifth criteria is satisfied but not the first, second, third, or fourth criteria, assign a low value (SOClowtto the battery state of charge (SOCbatt); and
      vi. output the assigned battery state of charge (SOCbatt) as the single battery pack state of charge value.

10. The system of claim 9, wherein the battery management system is further configured to use the cell state of charge and threshold values to determine if there is a battery fault or error.

11. A method for determining a battery pack temperature, the method comprising:
    a. assigning a plurality of temperature threshold variables;
    b. obtaining a plurality of temperature readings from a battery pack;
    c. evaluating the plurality of temperature readings against a plurality of criteria, including:
       i. determining if a first criteria is satisfied and, if so, assigning a high value (Thigh) to the battery temperature (Tbatt);

ii. determining if a second criteria is satisfied but not the first criteria, and if so, assigning a mid-high value (Tmidhigh) to the battery temperature (Tbatt);

iii. determining if a third criteria is satisfied but not the first or second criteria, and if so, assigning an average of the obtained plurality of temperature readings (Tavg) to the battery temperature (Tbatt);

iv. determining if a fourth criteria is satisfied but not the first, second, or third criteria, and, if so, assigning a mid-low value (Tmidlow) to the battery temperature (Tbatt);

v. determining if a fifth criteria is satisfied but not the first, second, third, or fourth criteria, and, if so, assigning a low value (Tlow) to the battery temperature (Tbatt); and d. outputting the battery temperature (Tbatt).

12. The method of claim 11 further comprising:

a. assigning a plurality of state of charge threshold variables;

b. obtaining a plurality of state of charge readings from the battery pack;

c. evaluating the plurality of state of charge readings against a plurality of criteria; and d. outputting a single battery pack state of charge to a vehicle system.

13. The method of claim 12, wherein evaluating the plurality of state of charge readings against a plurality of criteria further comprises:

a. determining if a first criteria is satisfied and, if so, assigning a maximum value (SOCrnax) to the battery state of charge (SOCbatt);

b. determining if a second criteria is satisfied but not the first criteria, and if so, assigning a mid-high value (SOCmidhigh) to the battery state of charge (SOCbatt);

c. determining if a third criteria is satisfied but not the first or second criteria, and if so, assigning an average of the obtained state of charge readings SOCavg) to the battery state of charge (SOCbatt);

d. determining if the fourth criteria is satisfied but not the first, second, or third criteria, and, if so, assigning a mid-low value (SOCmidlow) to the battery state of charge (SOCbatt).

14. A vehicle system which performs the method of claim 11.

15. A vehicle having the system of claim 1.

16. A vehicle having the system of claim 9.

17. The battery system of claim 1, wherein the first criteria is whether the maximum value (Tmax) exceeds the high temperature threshold value (Thigh).

18. The battery system of claim 1, wherein the second criteria is whether the high-middle value (Thighmid) is less than or equal to the maximum value (Tmax) which is also less than the high temperature threshold value (Thigh).

19. The battery system of claim 1, wherein the third criteria is whether the low temperature threshold value (Tlow) is less than the minimum value (Tmin) which is less than or equal to the low-middle value (Tlowmid).

20. The battery system of claim 1, wherein the fourth criteria, is whether the minimum value (Tmin) is less than or equal to the low temperature threshold value (Tlow).

* * * * *

UNITED STATES PATENT AND TRADEMARK OFFICE
CERTIFICATE OF CORRECTION

PATENT NO. : 11,450,899 B2
APPLICATION NO. : 16/630310
DATED : September 20, 2022
INVENTOR(S) : Zhihong H. Jin Page 1 of 2

It is certified that error appears in the above-identified patent and that said Letters Patent is hereby corrected as shown below:

In the Specification

1. In Column 1, Lines 8-11, delete "This application claims priority to U.S. Provisional Patent Application No. 62/531,769 filed Jul. 12, 2017, the entire content of which is hereby incorporated by reference herein in its entirety." and insert -- This application claims priority as a national phase filing of International Application No. PCT/US2018/041882 entitled "Method for Determining Battery Pack Temperature and State of Charge," which has an International filing date of July 12, 2018, which claims priority from and the benefit of U.S. Provisional Application Serial No. 62/531,769, filed July 12, 2017, the entirety of all of which are hereby incorporated by reference herein in their entirety. --, therefor.

2. In Column 2, Line 32, delete "S(X" and insert -- SOC --, therefor.

3. In Column 8, Line 28, delete "(Thigh-Thighmnid)" and insert -- (Thigh-Thighmid) --, therefor.

4. In Column 8, Line 40, delete "*Tmax-" and insert -- *(Tmax- --, therefor.

5. In Column 9, Line 40, delete "S(X" and insert -- SOC --, therefor.

6. In Column 9, Line 49, delete "S(X" and insert -- SOC --, therefor.

7. In Column 9, Line 52, delete "S(X" and insert -- SOC --, therefor.

8. In Column 9, Line 55, delete "S(X" and insert -- SOC --, therefor.

9. In Column 10, Lines 27-28, delete "-SO-Clow" and insert -- (SOClow --, therefor.

10. In Column 10, Line 47, delete "-SOClow: and" and insert -- -SOClow; and --, therefor.

Signed and Sealed this
Ninth Day of April, 2024

Katherine Kelly Vidal
*Director of the United States Patent and Trademark Office*

CERTIFICATE OF CORRECTION (continued)
U.S. Pat. No. 11,450,899 B2

11. In Column 10, Line 65, delete "step." and insert -- step, --, therefor.

12. In Column 11, Line 3, delete "SOCbatt=SOCCavg;" and insert -- SOCbatt=SOCavg; --, therefor.

13. In Column 11, Line 5, delete "(SOCminimum)" and insert -- (SOC minimum) --, therefor.

14. In Column 11, Line 18, delete "SOCbatt:" and insert -- SOCbatt --, therefor.

15. In Column 11, Line 62, delete "SOCmax<SOChigh." and insert -- SOCmax<SOChigh, --, therefor.

16. In Column 12, Line 12, delete "S(X" and insert -- SOC --, therefor.

17. In Column 12, Line 21, delete "SOC:" and insert -- SOC --, therefor.

18. In Column 13, Line 32, delete "SOC:" and insert -- SOC --, therefor.

In the Claims

19. In Column 15, Line 53, in Claim 1, delete "(Tbatt;" and insert -- (Tbatt); --, therefor.

20. In Column 16, Line 33, in Claim 9, delete "(SOCdrop):" and insert -- (SOCdrop); --, therefor.

21. In Column 16, Lines 50-51, in Claim 9, delete "(SOClo-wtto" and insert -- (SOClow) to --, therefor.

22. In Column 17, Line 30, in Claim 13, delete "(SOCrnax)" and insert -- (SOCmax) --, therefor.

23. In Column 18, Line 6, in Claim 13, delete "SOCavg)" and insert -- (SOCavg) --, therefor.

24. In Column 18, Line 28, in Claim 20, delete "criteria," and insert -- criteria --, therefor.